United States Patent [19]

Singer et al.

[11] Patent Number: 4,985,270
[45] Date of Patent: Jan. 15, 1991

[54] CREAM SUBSTITUTE INGREDIENT AND FOOD PRODUCTS

[75] Inventors: Norman Singer, Highland Park, Ill.; Reed Wilcox, Littleton, Colo.; Joseph S. Podolski, Skokie, Ill.; Hsien-Hsin Chang, Lake Zurich, Ill.; Suseelan Pookote, Buffalo Grove, Ill.; John M. Dunn, Buffalo Grove, Ill.; Leora Hatchwell, Buffalo Grove, Ill.

[73] Assignee: The Nutrasweet Company, Deerfield, Ill.

[21] Appl. No.: 246,421

[22] Filed: Sep. 19, 1988

Related U.S. Application Data

[63] Continuation-in-part of Ser. No. 148,434, Jan. 26, 1988, Pat. No. 4,855,156, which is a continuation-in-part of Ser. No. 127,709, Dec. 2, 1987.

[51] Int. Cl.$^5$ .................... A23G 9/00; A23L 1/19; A23J 3/00
[52] U.S. Cl. .................... 426/515; 426/566; 426/567; 426/580; 426/583; 426/613; 426/656; 426/657; 426/614; 426/589; 426/572; 426/659
[58] Field of Search ............... 426/656, 657, 613, 565, 426/566, 567, 580, 583, 804, 614

[56] References Cited

U.S. PATENT DOCUMENTS

| | | | |
|---|---|---|---|
| 3,510,316 | 5/1970 | Decker | 426/567 |
| 3,556,813 | 1/1971 | Creswick | 426/567 |
| 3,892,873 | 7/1975 | Kolen et al. | 426/602 |
| 3,995,070 | 11/1976 | Nagasawa et al. | 426/657 |
| 4,168,322 | 9/1979 | Buckley et al. | 426/657 |
| 4,291,067 | 9/1981 | Buhler et al. | 426/657 |
| 4,308,294 | 12/1981 | Rispoli et al. | 426/564 |
| 4,364,966 | 12/1982 | Chang | 426/657 |
| 4,400,405 | 8/1983 | Morley et al. | 426/565 |
| 4,510,166 | 4/1985 | Lenchin et al. | 426/565 |
| 4,519,945 | 5/1985 | Ottenhof | 426/657 |
| 4,552,773 | 11/1985 | Kahn et al. | 426/565 |
| 4,631,196 | 12/1986 | Zeller | 426/580 |
| 4,713,254 | 12/1987 | Childs et al. | 426/657 |
| 4,734,287 | 3/1988 | Singer et al. | 426/657 |

OTHER PUBLICATIONS

Abd El-Salam et al., *J. Diary Res.*, 52, 299–301 (1985).
Berger et al., *J. Fd. Technol.*, 6, 285–294 (1971).
Brunner, "Milk Proteins", in *Food Proteins*, 175–207 (1977), ed. by J. F. Whitaker et al., AVI Publishing Co., Westport, Conn.
Buccheim, Elektronmikroskopische Darstellung der Struktur von Speiseels, Susswaren, 16, 763–767 (1970).
Buccheim, *Scanning Electron Microscopy*, III, 193–202 (1981), SEM Inc., AMF O'Hare (Chicago).
Buma et al., *Neth. Milk Dairy J.*, 25, 75–80 (1971).
Caloianu et al., *Egyptian J. Dairy Sci.*, 8, 151–161 (1980).
Carroll et al., *Food Microstructure*, 4, 323–331 (1985), SEM Inc., AMF O'Hare (Chicago).
Chang et al., *J. Inst. Can. Sci. Technol. Aliment*, 5(13), 134–137 (1972).
Cohen et al. (eds.), *Studies of Food Microstructure*, Scanning Electron Microscopy, Inc., O'Hare, Ill. (1981), title page and Table of Contents only.
Cohn et al., *J. Biol. Chem.*, 109, 169–175 (1935).
Creamer et al., *New Zealand Journal of Dairy Science & Technol.*, 13, 9–15 (1978).

(List continued on next page.)

*Primary Examiner*—Jeanette Hunter
*Attorney, Agent, or Firm*—Marshall, O'Toole, Gerstein, Murray & Bicknell

[57] ABSTRACT

Non-fat and reduced fat whipped frozen dessert products wherein part or all of the milk fat, vegetable fat or oil ordinarily incorporated therein is replaced by a proteinaceous macrocolloid of, e.g., denatured whey protein particles or particles having a core of casein surrounded by a shell of denatured egg white protein. Illustrative embodiments include non-fat ice cream analog products having reduced calorie content, enhanced food value due to increased protein content, and possessing the physical and organoleptic character of full fat ice creams. The egg white protein/casein particles can be used also in sauces, dips, spreads, icing and cream pie fillings.

43 Claims, 4 Drawing Sheets

OTHER PUBLICATIONS

Davies et al., *J. Dairy Res.*, 50, 67–75 (1983).
Davies et al., *J. Dairy Res.*, 45, 53–58 (1978).
*Documentia Geigy*, Ed. by K. Diem et al., Geigy Pharmaceuticals, 510–511 (1970).
El Shabrawy et al., *Annals Agric. Sci., Fac. Agric.*, Ain-Shams Univ., Cairo, Egypt, 29(2), 747–753 (1984).
El-Shabrawy, *Egypt J. Food Sci.*, 14(2), 283–188 (1986) (Abstract).
Gouda et al., *Annals Agric. Sci., Fac. Agric.*, Ain-Shams Univ., Cairo, Egypt, 29(2), 755–762 (1984).
Green et al., *J. Dairy Res.*, 50, 341–348 (1983).
Heertje et al., *Neth. Milk Dairy J.*, 35, 177–179 (1981).
Holt, *Food Microstructure*, 4, 1–10 (1985), SEM Inc., AMF O'Hare (Chicago).
Hood et al., *J. Food Science*, 39, 117–120 (1974).
Kalab, *J. Dairy Sci.*, 62(8), 1352–1364 (1979).
Kalab, *Int'l. Dairy Congress Proc.*, 990–991 (1978).
Kalab et al., *Food Microstructure*, 2, 51–66 (1983), SEM Inc., AMF O'Hare (Chicago).
Kalab, *Scanning Electron Microscopy*, III, 261–272 (1979), SEM Inc., AMF O'Hare (Chicago).
Kalab et al., *Milchwissenschaft*, 31(7), 402–408 (1976).
Kalab et al., *J. Dairy Sci.*, 56(7), 835–842 (1972).
Kalab et al., *Scanning Electron Microscopy*, III, 153–162 (1981), SEM Inc., AMF O'Hare (Chicago).
Kimura et al., *J. Electron Microscopy*, 24(2), 115–117 (1975).
Kimura et al., *Int'l. Dairy Congress Proc.*, 238, 239–240 (1978).
McMahon et al., *J. Dairy Sci.*, 67, 499–512 (1984).
Mohammed et al., *N. Z. J. Dairy Sci. & Technol.*, 22, 191–203 (1987).
Moor, "Conformation and Functionality of Milk Proteins", in *Functionality & Protein Structures*, ed. by A. Pour-El, 65–79, American Chemical Society, Washington (1979).
Morr, *Kieler Milchw. Forschung*, 35(3), 333–343 (1983).
Omar, *Food Chemistry*, 25, 183–196 (1987).
Omar et al., *Food Chemistry*, 22, 1476–163 (1986).
Omar, *Food Chemistry*, 15, 19–29 (1984).
Omar, *Die Nahrung*, 29, 119–124 (1985).
Pao et al., USDA, Human Nutrition Information Science, *Home Economics Research Report No. 44*, pp. 1–21, 44–45, 296–297, 312–313, 330–331, 336–337, 352–353 (1982).
Ray et al., *Scanning Electron Microscopy*, 99–104 (1981), SEM Inc., AMF O'Hare (Chicago).
Rose et al., *J. Dairy Sci.*, 49, 1091–1097 (1966).
Ruettimann et al., *Enzyme Microb. Technol.*, 9, 578–589 (1987).
Schmidt et al., *Neth. Milk Dairy J.*, 27, 128–142 (1973).
Tamime et al., *Food Microstructure*, 3, 83–92 (1984), SEM Inc., AMF O'Hare (Chicago).
Tung et al., *Scanning Electron Microscopy*, 231–238 (1981), SEM Inc., AMF O'Hare (Chicago).
U.S. Dept. of Agriculture: *Nutrition Monitoring in the U.S.*, U.S. DHHS, U.S. DOA, Hyattsville, Md., Jul. 1986.
Wolf et al., *Cereal Chem.*, 52, 387–396 (1975).
Wolf et al., *Scanning Electron Microscopy*, III, 239–252 (1981), SEM Inc., AMF O'Hare (Chicago).
Fed. Reg. 1991–1992 (Mar. 26, 1958)
GRAS Affirmation Petition for "Modified Protein Texturizers in Frozen Desserts," Kraft Inc. Exhibit 14 Fat Reduction Technologies Historical Perspective (Prepared May 13, 1989).

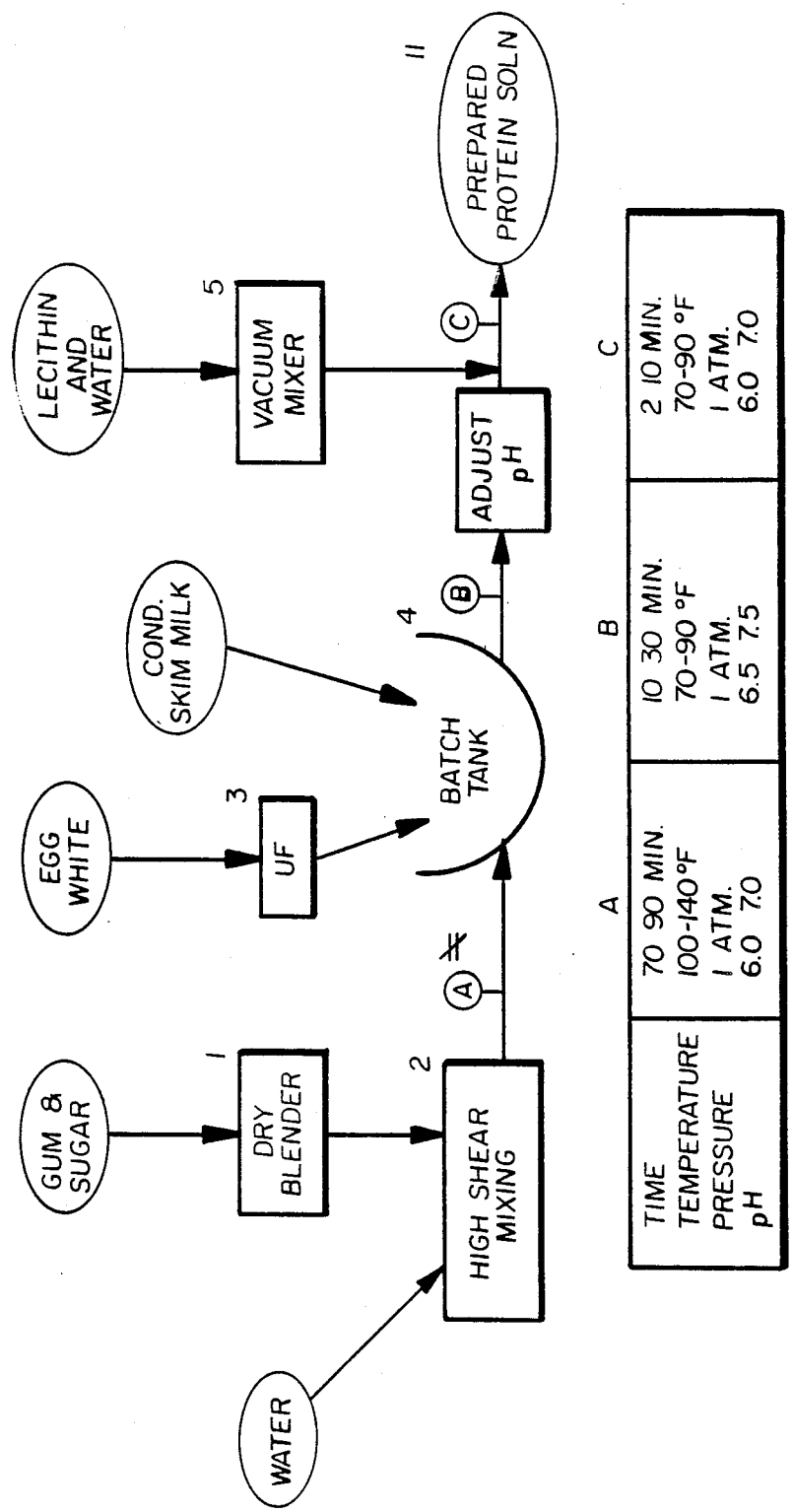

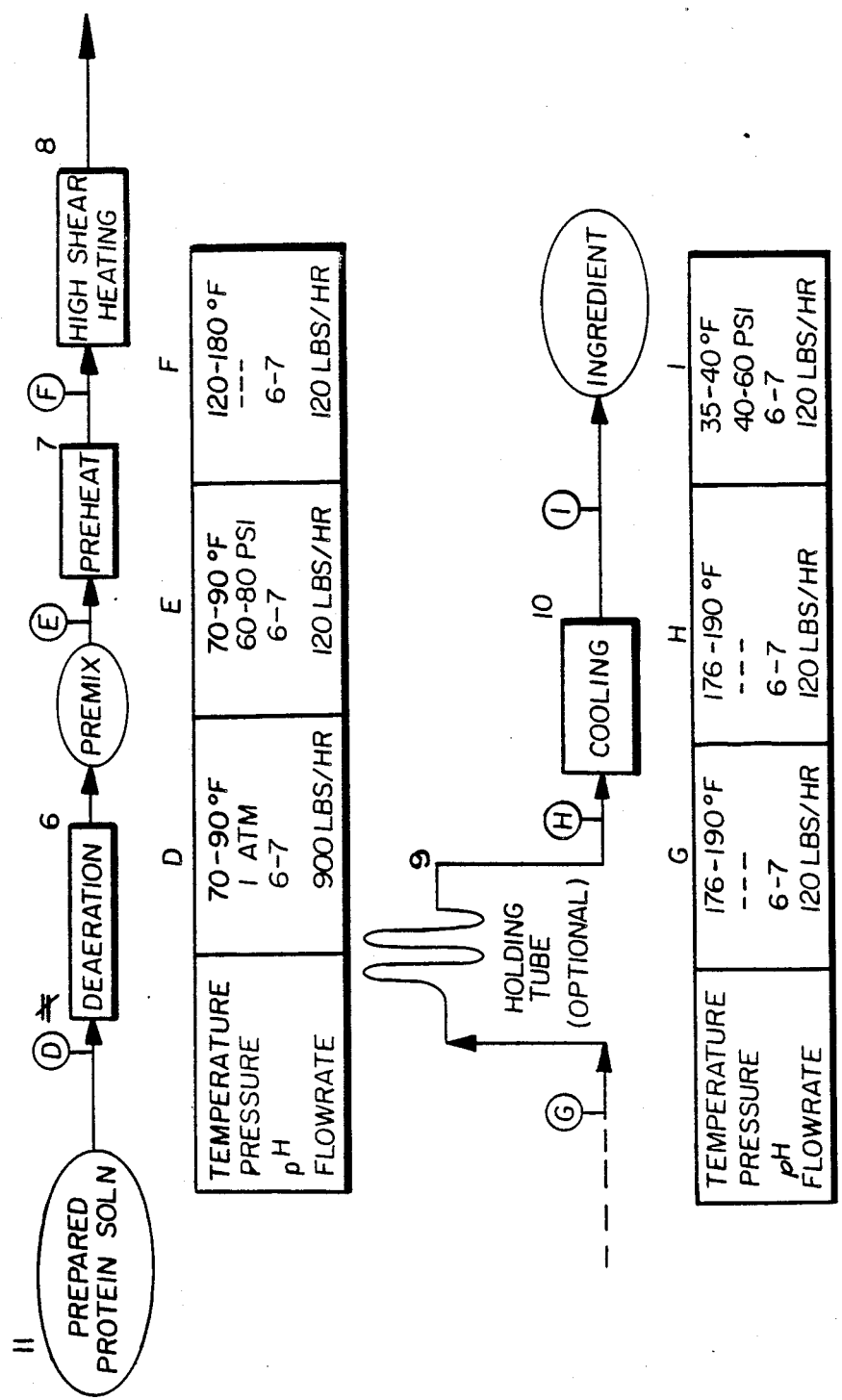
FIG. IA

CREAM SUBSTITUTE INGREDIENT AND FOOD PRODUCTS

Cross-Reference to Related Applications

This is a continuation-in-part of copending U.S. patent application Ser. No. 148,434, filed Jan. 26, 1988 now U.S. Pat. No. 4,855,156 which is a continuation-in-part of allowed copending U.S. patent application Ser. No. 127,709, filed Dec. 2, 1987.

FIELD AND BACKGROUND OF THE INVENTION

The present invention relates generally to non-fat and reduced-fat products which possess the organoleptic characteristics of full fat-containing products and more particularly to frozen dessert products such as ice cream and related frozen dairy desserts. Additionally, the present invention relates to a cream substitute ingredient formed of coagulable protein such as egg white enveloping a nucleating agent such as casein micelles and to novel food products including frozen desserts, mousses, cream pie fillings and icings, which contain this cream substitute.

"Frozen dessert" is a generic term applied to a wide variety of products including ice cream, frozen custard, ice milk, sherbet, water ice, frozen dairy confections, frozen confections, dietary frozen desserts, Mellorine and non-dairy desserts, all of which are defined according to U.S. Government Federal Standards of identity. Frozen dessert products for which no Federal Standards exist include frozen puddings, mousse and frozen shakes. Among the "dairy" frozen desserts minimum standards exist for milk fat and/or milk solids content. For example, ice cream must contain not less than 10% milk fat and 20% total milk solids (comprised of the total of milk fat and Milk Solids Non-Fat, "MSNF"); ice milk must contain 2 to 7% milk fat and not less than 11% total milk solids; and sherbet must contain 1 to 2% milk fat and 2 to 5% total milk solids. See, generally, Redfern, R. S. and Arbuckle, W. S., "Ice Cream Technology Manual", 4th Ed., 1985, Redfern & Assoc. Ltd., Raleigh, N.C. 27622, the disclosures of which are incorporated by reference herein for purposes of establishing the background of the invention.

Ice creams and other whipped frozen dairy desserts are actually rather complicated forms consisting of air bubbles surrounded by a partly frozen emulsion wherein ice crystals and solidified fat globules are embedded in the unfrozen water phase. Estimates of the sizes of the coarsely dispersed structural components of ice cream vary. Ice crystal sizes are reported to vary in size between 20 to 60 microns in diameter and to be situated approximately 7 microns apart; air cells are reported to range in size between 10 to 175 microns and to be situated about 125 microns apart; and solidified fat globules are reported to vary in size from 0.2 to 2.0 microns and to form agglomerations providing a "skin" around trapped air cells. See, B. H., et al., eds., Avi Publishing Company, Inc., Westport, Conn., at pages 896-14 913, the disclosures of which are incorporated by reference herein for purposes of establishing the background of the invention.

It is well known that the fat content of frozen dairy desserts plays a substantial role not only in the body and texture of the product, but also its flavor characteristics. Smoothness of ice cream texture is essentially inversely proportional to the average size of ice crystals. Increases in the milk fat content for virtually any given frozen dessert formulation will both decrease the ice crystal size and the distance between crystals. Despite the expense and high caloric value attending use of milk fat, as well as the susceptibility of milk fat to oxidation causing off flavors and its propensity to provide whipped or buttery texture effects, full fat ice cream products are generally more widely preferred to ice milk, sherbets and the like. Indeed, the so-called "premium grade" ice creams are essentially characterized by higher than standard milk fat contents in the range of 15 to 18% and are recognized as products of correspondingly increased palatability and smoothness and enhanced body and texture in comparison to standard grade ice cream and dairy dessert products having lower fat contents.

While attempts have been made to develop frozen dessert product formulations wherein part or all of the milk fat content ordinarily present is replaced by a non-fat material, none of the resulting products has achieved any substantial success as a replacement for full fat ice cream or ice milk. See, for example, U.S. Letters Patent No. 4,510,166 relating to ice cream formulations wherein starch gels are suggested as fat replacement materials and U.S. Letters Patent Nos. 4,421,778 and 4,552,773 relating to whipped food products incorporating beta-phase tending crystalline fats. See also, British Patent No. 915,389 and U.S. Letters Patent Nos. 3,510,316, 3,556,813, 4,400,405, and 4,631,196.

There thus continues to exist a long standing need in the art for non-fat and reduced fat frozen dessert products which possess the physical and organoleptic characteristics of full fat frozen dairy desserts. Ideally, such products would equal or surpass standard frozen whipped dessert products in nutritional value but have reduced caloric content. Additionally, there exists a need for a fat or cream substitute ingredient that can be prepared, stored and used in making a variety of low/no fat food products including frozen whipped desserts.

SUMMARY OF THE INVENTION

According to one of its aspects, the present invention provides non-fat and reduced fat whipped frozen dessert products wherein part or, preferably, all of the milk fat, vegetable fat, or oil ordinarily incorporated therein is replaced by a proteinaceous macrocolloid comprising denatured protein particles. Products of the invention possess the physical and organoleptic characteristics of full fat products despite the absence or substantially reduced content of fat/oil droplets or globules which are known to play a critical role in air cell formation and in the development and maintenance of low average ice crystal size in frozen whipped desserts. The ability to partially or totally replace fats or oils with proteinaceous macrocolloid materials gives rise to highly desirable products with reduced caloric contents but very high nutritional content owing to the presence of additional protein. The manufacture of frozen dessert products according to the invention requires no equipment or handling other than that ordinarily employed in the preparation of frozen dairy desserts and in all instances the proteinaceous macrocolloid may be incorporated into dessert formulations as a direct replacement for milk fat or vegetable fats or oils.

The present invention thus provides improved frozen whipped dessert foodstuffs wherein the improvement comprises the partial or total replacement of fat in premix formulations by a macrocolloid of substantially non-aggregated particles comprising denatured protein having in a dry state a mean diameter particle size distribution ranging from about 0.1 microns to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state forming said macrocolloid having substantially smooth, emulsion-like organoleptic character. Preferred products of the invention comprise frozen whipped desserts of the type which would ordinarily contain milk fat and wherein the protein macrocolloid totally replaces the fat ordinarily present, providing, for example, ice cream analog products having the physical properties and organoleptic character of premium grade ice cream products but containing less than about one percent fat.

Presently preferred proteinaceous macrocolloids for use in practice of the invention are derived from undenatured substantially soluble proteins derived from animal, vegetable and microbial sources, with dairy whey, egg white albumen, soy and bovine serum albumin protein sources being presently most preferred. Among the desired macrocolloids are those described in U.S. Letters Patent No. 4,734,287 by Singer et al., and in U.S. patent application Ser. No. 127,955, filed Dec. 2, 1987 as a continuation-in-part thereof, both incorporated by reference herein. Macrocolloid products for use in practice of the present invention are suitably prepared through use of apparatus as described in co-owned, co-pending, U.S. patent application Ser. No. 127,710, filed Dec. 2, 1987 by Singer et al., entitled "Fluid Processor Apparatus", the disclosures of which are specifically incorporated by reference herein, but may be prepared through use of any suitable apparatus capable of imparting controlled heat and high shear conditions to the starting material protein solution undergoing macrocolloid-forming treatment. Where it is desired to employ dairy whey as the starting material for formation of a proteinaceous macrocolloid for use in a frozen dessert of the present invention and where it is desired to reduce cholesterol and lipid content of the proteinaceous starting material, pre-treatment may be accomplished according to the methods described in co-owned, co-pending, U.S. patent application Ser. No. 127,402, filed Dec. 2, 1987 by Singer et al., entitled, "Methods for Extraction of Cholesterol and Lipids" which is incorporated by reference herein.

In another of its aspects, the present invention provides novel methods for preparing reduced calorie whipped frozen dessert products, especially dairy dessert products such as ice cream, ice milk, sherbet and the like, which methods involve the step of replacing the fat and/or oil which is conventionally employed in the product with a prefabricated proteinaceous macrocolloid as described above. Preferably at least 50% of the fat and/or oil is replaced and most preferably the entirety is replaced, leaving a fat content which essentially comprises only such fats as are present in standard flavorings such as cocoa or other fat-containing ingredients such as egg yolk solids in frozen custard products.

In still another of its aspects, the present invention provides for the preparation of reduced calorie whipped frozen dessert products wherein fat-free or substantially fat-free premixes are provided which include heat coagulable protein sources such as egg white, whey protein, soy protein and the like. Upon subjecting these premixes to heat treatment (e.g., pasteurization processing) and relatively high shear blending prior to freeze processing, particles of denatured protein are formed in the mix in situ, and the particles so formed act as a replacement for fat/oil globules in the final frozen dessert product. Premixes prepared according to the invention are characterized by protein contents ranging from about 5 to about 20 percent (and preferably about 7.5 to about 12.5 percent), with from about 25 to about 100 (and preferably about 50) percent of the total protein incorporated comprising heat coagulable protein. Continuous process pasteurization at high temperatures for correspondingly shorter durations (e.g., 20–25 seconds at 176° F..) has been found to provide for the most desirable final products.

Whether prepared by direct incorporation of macrocolloid materials or by in situ formation of protein particles in a premix, preferred frozen whipped dessert products of the invention preferably include denatured protein particles in the size range of about 0.01 to about 3.0 (and preferably about 0.1 to about 2.5) microns in diameter and wherein particles having diameters in the range of from about 0.5 to 2.5 microns are present in quantities of at least $1 \times 10^8$ particles per cubic centimeter of the final product. It is generally preferred that there be from $1 \times 10^8$ to $1 \times 10^{12}$ or more such particles and most preferred that $=20$ there be in excess of $1 \times 10^9$ such particles, allowing for the final products to closely approximate full fat products in terms of creaminess, smoothness and overall texture.

It is correspondingly within the ambit of the present invention to prepare fat-free or substantially fat-free premixes for frozen whipped desserts which comprise from 5 to 20 percent protein wherein from 25 to 100 percent of the total protein is heat coagulable and to subject such premixes to heat pasteurization and high shear blending to develop therein a population of at least $1 \times 10^8$ particles per cubic centimeter of denatured protein particles having diameters of from 0.5 to 2.5 microns. Premixes so constituted provide, upon "finishing" in conventional automatic ice cream mixing/freezing apparatus, ice cream analog products having the textural characteristics of full fat ice creams, ice milks and the like.

In yet another aspect of the present invention, a cream substitute food ingredient is prepared from coagulable protein such as egg white and a nucleating agent such as casein micelles by, e.g., heating egg whites and casein micelles, under shear conditions to form substantially non-aggregated composite macrocolloidal particles of denatured protein wherein the particles are substantially spheroidal in shape and have a mean particle size distribution effective to impart an emulsion-like organoptic character when orally ingested, i.e., diameters ranging from about 0.1 microns to about 3.0 microns, with less than about 2 percent of the total number of particles exceeding 3.0 microns in diameter. These protein particles, in a hydrated state, form a macrocolloid having a substantially smooth, emulsion-like organoleptic character, i.e., a fat or creamlike mouth feel and when viewed in cross-section, are seen to comprise a "core" of nucleating agent material and a "shell" of the coagulable protein. The coagulable protein/nucleating agent food ingredient is used as a fat/cream substitute for preparing low or no fat whipped frozen desserts and additionally can be used as a cream substitute ingredient in the preparation of other low or no fat food products such as sauces, cream pie fillings, dips, spreads, mousses and icings.

Other aspects and advantages of the invention will be readily understood upon consideration of the following detailed description of illustrative embodiments thereof.

BRIEF DESCRIPTION OF THE DRAWINGS

FIG. 1 and 1A is a schematic flow diagram of a process applicable to preparation of an egg white/casein micelle cream substitute ingredient according to the present invention;

Figure 3:
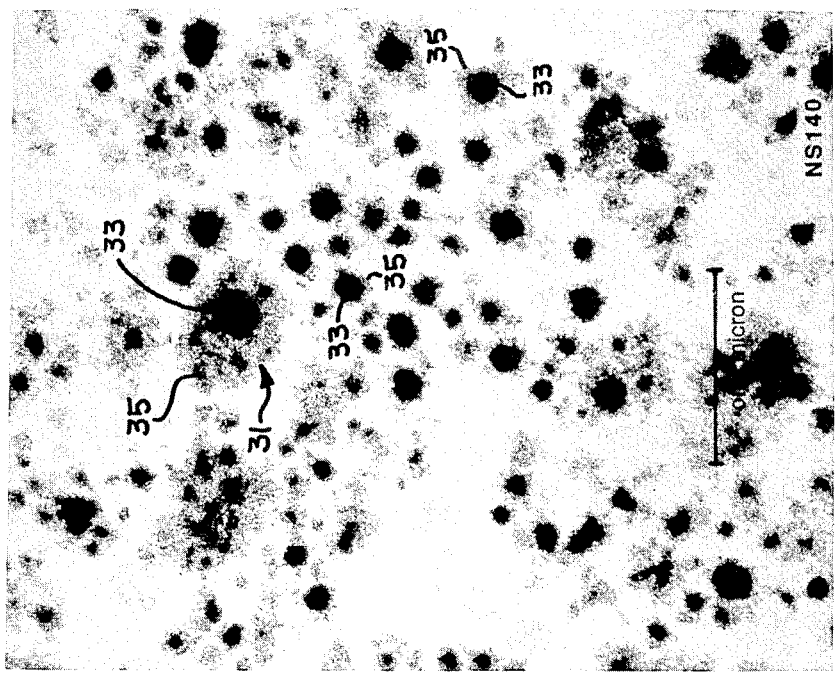
FIG. 3 is an electron micrograph which shows egg white protein/casein micelle macrocolloidal particles formed during the in situ process for preparation of a frozen whipped dessert as hereinafter described.

All of the micrographs are at a magnification of 32,500 and include a 1 micron reference standard.

DETAILED DESCRIPTION

It has been determined according to the present invention that proteinaceous water-dispersible macrocolloids which may be produced from a variety of protein materials and which in a hydrated state have a substantially smooth, emulsion-like, organoleptic character may be employed as a fat and/or oil replacement in whipped frozen dessert products such as ice cream. The proteinaceous, water-dispersible macrocolloids are comprised of substantially non-aggregated particles of denatured protein which are characterized by having in a dry state a mean diameter particle size distribution ranging from about 0.1 microns to about 2.0 microns, with less than about 2 percent of the total number of particles exceeding 3.0 microns in diameter. The particles are further characterized by being generally spheroidal as viewed at about 800 power magnification under a standard light microscope.

The macrocolloid materials may be produced by controlled denaturation from a wide variety of proteinaceous starting materials which, before processing, are substantially soluble in water and are substantially undenatured.

The particularly desired organoleptic qualities of the macrocolloid materials employed according to the present invention are particularly dependent upon the sizes and shapes of the macrocolloid particles.

Specifically, it has also been found that dispersions of larger, denatured protein coagulates (i.e., with diameters greater than about 3 microns when dried) impart an undesirable chalky mouth feel. This chalkiness can be identified as being a less coarse variant of the gritty mouth feel of known heat denatured proteins (about 15-175 microns). It appears that a sharply defined perceptual threshold is crossed as the number of particles of protein coagulate with diameters larger than about 2 to 3 microns in their largest dimension increases.

The shapes of particles are also important. Fibrous particles having lengths generally greater than about 5 microns and diameters generally less than about 1 micron produce pastes which are smooth but dilatant; as more force is applied between the tongue and palate, an increasing sense of solid substance is perceived. The resulting impression is not cream-like. As fibers become shorter approaching spherical shapes, this character decreases.

Further, particles which are generally spheroidal tend to produce a smoother, more emulsion-like organoleptic sensation. Where increased proportions of macrocolloid particles are generally spheroidal or where the macrocolloid particles are more perfectly spheroidal, it may occur that somewhat greater proportions of particles may have diameters greater than about 2 microns without detriment to the organoleptic character of the macrocolloid mixture. As alluded to hereinbefore, however, rod-like particles with diameters greater than about one micron tend to produce a chalky to powdery mouth feel.

Particle sizes of about 0.1 microns contribute a greasy mouth feel which may be objectionable if it is perceived as the dominant tactile characteristic. Because the perceived transition between an emulsion-like like mouth feel and a greasy mouth feel appears to be much more gradual than is the transition between the former and the chalky mouth feel, greater proportions of particles on the order of 0.1 microns in diameter are acceptable in macrocolloids employed according to the present invention. Thus, provided that the mean particle size is not less than 0.1 microns, the emulsion-like character is dominant, notwithstanding that the distribution itself may include a substantial proportion of individual particles having diameters smaller than 0.1 microns.

Proteins useful in preparation of macrocolloids include those from such varied and diverse sources as vegetable whey from oil seeds, mammalian lactations, blood serum and avian ova. Preferably, the present process relates to proteins which are globular proteins when in their native state. From the perspective of traditional protein classification, useful proteins include those which are soluble in aqueous solvent systems and are selected from amongst the simple, conjugated and derived proteins. Suitable simple proteins include: albumins, globulins and glutelins. Suitable conjugated proteins include: nucleoproteins; glycoproteins and muccoproteins, (also known collectively as glucoproteins); phosphoproteins (sometimes themselves classed as simple proteins); chromoproteins; lecithoproteins; and, lipoproteins. Heat-coagulable derived proteins are also suitable.

Simple proteins not useful are the albuminoids (a.k.a. scleroproteins) such as elastins, keratins, collagens and fibroins, all of which are insoluble in their native states. Protamines (a.k.a. protamins) and histones are not heat coagulable and are therefore unsuitable as raw materials for heat denaturing processing.

Conjugated proteins which are both soluble and heat coagulable are useful. Similarly, derived proteins (i.e., the products of various proteoelastic or denaturing processes) which, notwithstanding their derivation, remain both soluble and heat coagulable, are also useful as raw materials, provided, of course, that they are not, by virtue of their derivation, rendered, ab initio, incompatible with the manifestation of the desired, organoleptic properties in the final product of the present process. In general, however, many proteins, metaproteins (a.k.a. infraproteins), coagulated proteins, proteoses, peptones and peptides (a.k.a. polypeptides) lack one or both of these prerequisite characteristics.

The preferred protein for use in the present invention may vary according to considerations of availability, expense, and flavor associated with the protein as well as the nature of impurities in and other components of the protein source. Preferred proteins include globular proteins such as bovine serum albumin, egg albumen and soy protein, with dairy whey and egg albumen proteins being particularly preferred. Sources of proteins which may be subject to treatment often comprise various impurities. It is desirable therefore that where proteins useful with the invention are naturally associated with insoluble components, such components be smaller than the 3.0 micron limit or be removable prior to processing or rendered smaller than that limit in the course of processing.

Once a specific protein source is selected, the protein solution is treated for relatively short times to relatively specific temperature, shear and pH conditions. Depending on the protein, the presence of specified amounts of polyhydroxy compounds (e.g., sugars), aggregate blocking agents and other optional ingredients will assist in optimizing the yield of desired products. The macrocolloids are produced according to a controlled heat denaturation process during which high shear is utilized to prevent the formation of any significant amounts of large particle size protein aggregates. The denaturation process is preferably carried out at a pH less than the midpoint of the isoelectric curve of the selected protein and preferably at a pH about 1 pH unit below the midpoint of the isoelectric curve. The process may be carried out at lower pHs with the requirement that the processing pH should not be so low as to result in acid degradation of the protein and the limitation that the pH should generally not be less than about 3. As described, infra, pH's greater than the midpoint on the isoelectric curve may also be employed where a nucleating agent is also present during denaturation.

The precise temperatures and shear conditions applied in macrocolloid preparation are routinely selected and extend out for times sufficient to form denatured proteinaceous macrocolloidal particles which are greater than about 0.1 microns in diameter while avoiding the formation of any substantial amounts of fused particulate proteinaceous aggregates in excess of about 2 microns. Preferred shear conditions for processing a given protein solution are best determined by using "oversize" particle testing.

Particle size testing provides a measure of organoleptic quality of the products of the present invention.

One of the simplest and most rapid of the techniques available to a man skilled in the art involves the preparation of an optical slide in a manner which is analogous to the preparation of clinical blood smears. Pursuant to this method, an appropriate dilution of the dispersed macrocolloid is first prepared and adjusted to a pH preferably in the range of 6.5 to 7. High speed magnetic stirring, ultrasonication or homogenization is then applied to fully disperse any weak associations there might be between the individual macrocolloid particles. A small amount (e.g., 8 microliters) of the diluted, neutralized dispersion is then applied to a glass microscope slide of the variety often used in biological studies, and allowed to dry. The sample is viewed under known magnification using "ruled" occular eyepieces with well-known methods. The dispersed macrocolloidal particles of the sample is then visually compared with the reticules on the occular to provide a good estimation of the statistical incidence of oversize or aggregated particles within the population as a whole.

An alternative means for analyzing particle size distributions involves the use of an image analyzing computer, for example, a QUANTIMET TM 720 available from Cambridge Institute, U.K.

Another means involves the use of the MICROTRAC TM particle size analyzer. The general aspects of this technique are described in an article entitled "Particle Size Analysis and Characterization Using Laser Light Scattering applications" by J. W. Stitley, et al. in Food Product Development, December, 1976.

As will be apparent to a man skilled in the art in light of the instant disclosure, sedimentation techniques may also be utilized for the purpose of rendering particle size determinations. It will be appreciated, however, that gravimetric techniques must take into account the protective colloid effects of, for example, whatever processing aids may have been used during the above-described heat denaturation treatment. One example of a gravimetric determination of the percent "oversized" protein aggregate is summarized hereinbelow:

1. A 5% weight by weight dispersion of the macrocolloid of the present invention is prepared and neutralized to a pH of between 6.5 and 7;

2. A high fructose corn syrup having a specific gravity of 1.351, a pH of 3.3, a total nitrogen of 0.006% and a solids concentration of about 71% is added in a 1 to 4 weight by weight ratio to the neutralized 5% macrocolloid dispersion;

3. The mixture is then homogenized to disperse loose associations between the macrocolloid particles;

4. The mixture is then centrifuged at 478 gravities for 20 minutes at about 15 degrees Centigrade. The oversized protein aggregates, i.e., particles having a diameter substantially greater than 2 microns, can be expressed as a percentage of the weight of the protein contained in the centrifuged pellet divided by the weight of the protein contained in the macrocolloidal dispersion prior to centrifugation.

These tests are applicable in respect of both the macrocolloidal dispersions and the protein materials useful as raw materials in the production of said macrocolloids. As will be readily apparent to a man skilled in the art, capacitance based particle size analysis equipment such as, for example, the well known Coulter-Counter TM analyzers will not be suited to the present application, having regard to the charged nature of the macrocolloid particles at certain pH's, unless the macrocolloid is diluted with a salt (NaCl) solution of sufficient concentration that the salt ions overcome or "swamp" the natural charge on the macrocolloidal particles.

In accordance with the preferred macrocolloid preparative processing conditions, however, the aqueous protein solution is subjected to high temperatures for a very short time at shear rates of 7,500 to 10,000 reciprocal seconds or greater. For a one gallon Waring blender drive equipped with a miniaturized (e.g., 1 liter capacity) "Henschel" mixer, for example, a processing speed of 5000 rpm has been found to provide sufficient shear.

Preferred processing temperatures range from about 80° C. to about 120° C. with processing times ranging from about 3 seconds to about 15 minutes or longer with times of from about 10 seconds to about 2 minutes being preferred. Processing times are longer at lower temperatures, with treatment at 80° C. requiring as much as 15 minutes while processing times at temperatures between 90° C. and 95° C. being about five minutes. By contrast, at 120° C. the processing time may be only about 3 seconds. High processing temperatures are complemented by increased rates of heat transfer. Where the nature of the processing equipment permits, therefore, processing at high heat transfer rates/high denaturation temperatures for very short times is preferred. It should be noted, however, that at temperatures higher than 120° C. with correspondingly reduced product residence times, the resulting macrocolloid product is "thinner" and may be less desirable.

Processes for the production of the macrocolloids utilize an aqueous protein solution characterized by having a protein concentration between about 10% by weight and 20% by weight with protein concentrations between about 15% by weight and 18% by weight being preferred. At protein concentrations less than about 10% by weight, stringy masses tend to form. The stringy masses remain in a stable dispersion and have undesirable organoleptic qualities. Solutions having protein concentrations much in excess of about 20% by weight tend to become extremely viscous rendering impractical the application of requisite rates of shear to the protein solutions.

The aqueous protein solutions may further comprise up to 100 parts by weight (of protein) or more of a polyhydroxy compound, preferably a mono- or disaccharide. These compounds may be "naturally" present in the protein starting materials (e.g., lactose present in sweet dairy whey protein concentrates) or added to the solutions prior to denaturation processing. Preferred polyhydroxy compounds include reducing sugars such as lactose, glucose, fructose and maltose, with lactose being particularly preferred. Suitable non-reducing sugars include sucrose and lactitol.

The high level of shear useful in the preparative processing is believed to prevent the formation of large denatured protein aggregates during denaturation. Aggregate blocking agents may optionally be added to the aqueous solutions to facilitate production of desired products. The aggregate blocking agent is so selected or adjusted in concentration so that it does not in turn alter the pH of the mixture to outside of the optimal processing specifications. Suitable aggregate blocking agents include hydrated anionic materials such as xanthan gum (ordinarily included at 0.1% to 1.0% by weight of the protein concentrate), datem esters (0.5% to 2.0% by weight of the protein concentrate despite the fact that datem esters tend to contribute an off-flavor to the final product) and lecithin (1% to 10% by weight of the protein concentrate). Other suitable aggregate blocking agents include carrageenan, alginate and calcium steroyl lactylate.

Malto-dextrins produced by enzymatic or acid hydrolysis of starch provide another chemical aggregate blocking agent useful in practice of the invention. The preferred concentration is from 10% to 50% by weight of the protein concentrate. These materials are believed to have a protein-sparing effect, as does high fructose syrup, although the latter is not as efficient as the former in this regard. It will be appreciated that these blocking agents are carbohydrates and hence are a source of calories, a factor which may mitigate against their selection for use in applications such as reduced calorie foods.

The vegetable gum pectin is another suitable aggregate blocking agent for use in the present invention. Citrus pectin is preferred in fruit flavored end products while "clean" flavored end products such as vanilla ice cream analogs should advantageously use pectin derived from non-citrus sources, e.g., apple pectin. Also, in end products or cream substitute ingredients which contain calcium (milk products) the pectin employed as an aggregate blocking agent should be pectin which does not gel in the presence of calcium.

Hydrated lecithin and hydrated xanthan gum exemplify the differing effects of different blocking agents. Both impart lubricity to the mouth feel of the final product. Lecithin, however, being a slightly less effective blocking agent, produces a slightly larger average size macrocolloid particle. Those macrocolloid particles produced with xanthan aggregate blocking agent, however, are smaller and smoother particles. Both of the foregoing have a whitening effect on the final product in that they seem to assist in creating a more uniformly dispersed system thereby increasing the light scattering effect which is perceived as whiteness. Combinations of aggregate blocking agents also have been found to have useful attributes. It is preferred to use a combination of pectin and lecithin as aggregate blocking agents in the preparation of egg white/caseine micelle cream substitute ingredient described herein.

Other optional ingredients such as salts and end product components including suitable flavors, colors and stabilizers may generally be present in or added to the solution without adverse effect. In many cases (i.e., where the nature of the additive and its influence on the protein solution permits), it may be particularly desirable to include such end product components in the protein solution in order to avoid the need for subsequent, additional pasteurization steps following processing.

Protein starting materials may optionally be treated to remove cholesterol, fat and other impurities which may introduce off-tastes to the macrocolloid product. One such procedure comprises an extraction step wherein the protein material is contacted with a food-grade solvent which is preferably ethanol in the presence of a suitable food-grade acid. The protein material is then subjected to several wash and filtration steps to render the extracted protein product.

Suitable solvents include lower alkanols, hexane or the like, with ethanol being particularly preferred. Suitable food-grade acids include mineral acids such as phosphoric, and food grade organic acids such as acetic, citric, lactic, and malic with citric acid being particularly preferred.

The extraction procedure is particularly useful for the removal of cholesterol and fat from protein sources such as whey protein concentrate. In preferred extraction procedures providing optimal elimination of fat and cholesterol, the whey protein concentrate is extracted at 52° C. for six hours with a mixture of 90-97% alcohol (preferably about 90% ethanol), 3-10% water (preferably about 9%) and about 0.01-0.20% acid (preferably about 0.084% citric acid). In alternative practices providing highly desirable flavor and processing characteristics, the whey protein concentrate is extracted at 40° C. for four hours with a mixture of ethanol, water and citric acid with respective concentrations of 94.95, 5.0 and 0.05 percent. According to such procedures, whey protein concentrate comprising as much as 4.0% fat and 0.15% cholesterol prior to the extraction step comprised less than 2% fat and less than 0.02% cholesterol after such an extraction step.

Once the heat denaturation process is completed, the product may, optionally, be subjected to a homogenization treatment. Such a treatment is desirable in the case of products which are dilute (i.e., having a lower protein concentration) and/or neutralized, such as coffee whiteners for example. This treatment is useful in disrupting the relatively loose, inter-particle associations which occasionally form during processing. While not aggregated, (i.e., not fused into particles of substantially larger than 2 microns in diameter) those of the macrocolloids which are associated with one another (i.e., usually in doublets or triplets) are nonetheless organoleptically perceived as single composite particles which cannot be differentiated from aggregates on the basis of their respective mouth feels. The homogenization treatment divides these associations of particles into individual macrocolloidal particles having the desired mouth feel attributes. The homogenization treatment of dilute products having low macrocolloid concentrations (e.g., coffee whiteners) is preferably carried out at about a pH of 6 to 7. At such pH values, the distribution of electrical charges on the surfaces of the macrocolloids helps maintain an even dispersion of the macrocolloids in the aqueous medium. While any of the traditional homogenization treatments known in the art may be employed to this end, reasonable care must be taken to avoid exposing the macrocolloidal particles to such elevated temperatures as may cause them to aggregate to larger particles.

Particle size testing provides a measure of organoleptic quality of the products of the present invention. One of the simplest and most rapid of the techniques involves the preparation of an optical slide in a manner which is analogous to the preparation of clinical blood smears. Pursuant to this method, ten (10) grams of a paste-like food sample is weighed into a Waring blender and 190 grams of distilled water is added to make a 5% solution. The solution is then blended at high speed for 2 minutes and then pH-adjusted to 6.75-7.0. The sample is then subjected to high speed magnetic stirring during sonication for 1 minute using a probe sonicator (Braunsonic Model 2000 Sonicator, Burlingame, Calif.). This procedure breaks up any weak associations that might exist between the individual macrocolloid particles. The solution is then diluted further with deionized water to between 0.25% and 0.50% depending on particle concentration. This solution is then placed in an ultrasonic bath (Branson 2200 Ultrasonic Bath, Shelton, Conn.) for 1 minute immediately before slide preparation.

After shaking by hand for 10 seconds, 20 µl of the sample, as prepared above, is placed on the center of a microscope slide which has been placed in a Corning slide spinner. The slide is spun immediately after the sample has been placed on the slide. As soon as the slide is dry, usually within about 30 seconds, it is ready for microscopic evaluation.

The sample is observed with a Zeiss Axiomat Microscope equipped with a halogen light source (Zeiss, Thornwood, N.Y.) and a Dage MTI video camera (Michigan City, Ind.) and camera control using a 50X objective and a total magnification ranging between 1000 and 1600. The system is only capable of performing quantitative analysis on particles with diameters greater than about 0.25 microns. For this reason, all statistical measures of particle size herein, unless otherwise noted, refer to particles having major dimensions exceeding 0.25 microns. Nevertheless, particles between about 0.10 microns and about 0.25 microns may be viewed by an observer and their presence is routinely noted. Numerous fields (15 to 25) are scanned to subjectively evaluate the overall size and shape homogeneity/heterogeneity of the sample. Subsequent to qualitative evaluation of the sample, a field is chosen which appears to be representative of the entire sample. This image is then projected on a high resolution black and white television monitor (Lenco, Jackson, Mo.) for quantitative analysis.

The image on the television monitor is first digitized and is then translated from the television monitor to the computer monitor. During this digitization/translation step, the image is slightly reduced with the side effect that some of the particles that were separate on the original image become fused together and are thus not representative of the true particles. These apparently fused particles are then carefully edited out by comparing the old (television monitor) image to the new (computer monitor) image.

Approximately 250±50 particles are typically measured in one field. As many fields are scanned as are necessary to include 500 particles in the evaluation. Initially the number of particles in the image is determined along with their corresponding lengths and breadths. From this data, two additional variables, equivalent spherical (E.S.) diameter and volume, are calculated as follows:

$$Diameter = (B^2 \times L)^{1/3}$$

$$E.S.\ Volume = 4/3\pi B^2 L.$$

Where B equals breadth and L equals length.

When E.S. Diameter and Volume have been determined for the entire distribution of particles in the image, number-weighted ($D_n$) and volume weighted ($D_v$) mean E.S. diameters are calculated. $D_n$ is a number averaged particle size diameter which is calculated by summing the diameter of all particles in the distribution and dividing by the total number of particles. The $D_v$ (volume weighted mean diameter) weights each particle in relation to its volume and thus provides an indication of where the mean diameter lies on the basis of volume or implicitly of mass. Maximum Diameter ($D_{max}$) is simply the diameter of the largest particle present in the microscopic field.

This data can be plotted in the form of a histogram plot with E.S. diameter on the abcissa as a function of the number of particles as well as volume of particles. From these data, the percentage of particle volume over 2 microns as well as the maximum particle size diameter can also be directly determined.

In another aspect of the present invention, spheroidal particles described hereinbefore are produced by coagulating or denaturing a readily coagulable protein (preferably one which coagulates at a temperature of 85° C. or less), such as egg white protein (EWP), bovine serum albumin (BSA) and defatted whey protein, in the presence of a nucleating agent whereby the coagulable protein denatures around and envelops the nucleating agent, resulting in spheroidal particles having a core/shell configuration wherein the core is the nucleating agent and the shell is the denatured coagulable protein. The core or nucleating agent may occupy less than about 90 percent of the volume of the resultant spheroidal particle and usually occupies less than about 50 percent by volume of the particle. The balance of the particle is comprised of the denatured protein, e.g., denatured egg white protein.

It has been found that the particle formation can be conducted at a near neutral pH, i.e., above the midpoint of the isoelectric curve of the protein, when the protein is denatured in the presence of a nucleating agent. The coagulable proteins which will denature into macrocolloid particles are those proteins which are readily coagulable, i.e., egg white protein and bovine serum. Sweet whey protein concentrate does not form a core shell configuration with a nucleating agent (casein micelle) because the whey protein has a higher coagulation temperature.

The nucleating agent (NA) may be any organic or inorganic microparticulated substance having a size smaller than the desired size of the proteinaceous macrocolloidal end product particles to be employed as a fat/cream substitute. Usually the nucleating agent is also spheroidal in shape although such a shape is not critical, especially when the nucleating agent is to comprise less than about 25% by volume of the end product macrocolloid fat/cream substitute particles. The nucleating agent serves as a seed to promote egg white protein particle formation around the nucleating agent.

Suitable nucleating agents include casein micelles, microcrystalline cellulose, silica, reduced iron, zein and water insoluble proteins. The nucleating agent is a colloidal form, such as colloidal iron, colloidal zein, colloidal proteins and colloidal fumed silica. Mixtures of different nucleating agents can also be employed. A preferred nucleating agent is micellular casein.

Egg white protein is a preferred coagulable protein for preparing a core/shell configured particle. Egg white protein/nucleating agent ("EWP/NA") particles according to the invention are prepared by processing the EWP in the presence of the nucleating agent at elevated temperatures under shear conditions described herein to form macrocolloidal proteinaceous particles suitable for use as a fat/cream substitute. While the midpoint of the isoelectric curve of egg white protein is pH 4.5 to 5.5, the pH in the denaturation medium can be increased above the midpoint in the isoelectric curve to between about 6 and 7 and preferably to between about 6.2 and 6.6. The total protein content of the mixture subjected to processing is usually between about 5 and about 20 percent by weight. Polyhydric compounds (lactose) and aggregate blocking agents are also optionally employed.

In one preferred embodiment of the present invention, spheroidal protein particles are made from a combination of egg white protein and a source of substantially non-aggregated or native casein micelles as the nucleating agent. These egg white protein/casein micelle ("EWP/CM") particles are made by heating a mixture of egg white protein and a source of casein micelles under shear conditions described hereinbefore. Unlike the case wherein macrocolloid particles are formed from egg white protein in the absence of a nucleating agent (see, Example 3, infra), it has been found though that the EWP/CM protein particles can be formed at a pH above the midway point of the egg white protein isoelectric curve (see Examples 6 and 7, infra).

Casein micelles, the presently preferred nucleating agent, are naturally occurring spheroidally shaped protein particles present in mammalian milk and generally have a diameter of from 0.1-0.4 microns. Any source of casein micelles is acceptable in practicing the present invention but cow's milk is preferred because casein micelles are present in high concentration. Skim milk, condensed skim milk and ultrafiltered skim milk are especially preferred because these will have reduced amounts of fat which is desirable for applications of fat/cream substitute.

The total protein content of the reaction mixture subjected to heat and shear conditions in forming EWP/CM particles is usually between about 15 and about 20 percent by weight but the total protein and the ratio of egg white protein to casein micelle protein are not critical. The egg white usually contributes from about 25 to about 99 percent of the total protein while the casein micelle source may contribute from about 1 to about 75 percent of the total protein, and preferably from about 1 to about 40%. Desirably concentrated egg white and a concentrated source of casein micelles are employed. Therefore, freeze-dried egg whites and ultrafiltered egg whites are preferred egg white sources and condensed skim milk and ultrafiltered skim milk are preferred casein micelle sources.

The EWP/CM protein particles are preferably prepared in the presence of a polyhydric compound and an aggregate blocking agent, both described hereinbefore. Preferably the combination of sucrose and lactose (from condensed skim milk sources) constitutes the polyhydric compound component and a combination of lecithin and pectin constitutes the aggregate blocking agent component. Food grade acids may be employed to adjust the pH and water is employed to adjust the concentration of ingredients. When ultrafiltered egg white and condensed skim milk are employed to make the EWP/CM protein particles a typical reaction mixture would be as follows: ultrafiltered egg white protein, 40-60 weight percent (providing protein in an amount of 8-12 percent of the total mixture weight); condensed skim milk, 10-33 weight i percent (providing protein in an amount of 1-4 percent of the total mixture weight); cane or corn sugar, 0-10 weight percent; pectin of vegetable origin, 0-0.5 weight percent; lecithin, 0-1.0 weight percent; food grade acid, 0-0.3 weight percent (to adjust the pH to 6 to 7); and water, q.s. for 100 weight percent.

FIG. 1 and 1A illustrates a preferred embodiment of a procedure for the preparation of EWP/CM protein particles providing a fat replacing ingredient according to the invention. The time, temperature, pressure and pH conditions for each step are listed in FIG. 1 and 1A and correspond to the circled letters in the flow diagram. In this emodiment, a sugar and gum aggregate blocking agent, such as pectin or guar, are dry blended in a conventional dry blending device 1 to give a Pre-Mix A. Pasteurized liquid egg white is ultrafiltered in conventional ultrafiltration equipment 3, preferably having a polysulfone membrane with a nominal molecular weight cut-off of about 10,000 which yields a concentrated egg white (Pre-Preparation B) with a protein concentration of 15-25% by weight. Lecithin is hydrated in purified water (reverse osmosis) in a well mixed tank under vacuum 5 to give Pre-Mix C. A dilute solution of a food grade acid, such as lactic acid or citric acid, is prepared with purified water (Pre-Mix D).

Pre-Mix A is hydrated in purified water using a high-shear in-line or batch mixer 2. Pre-Preparation B and condensed skim milk are added to the hydrated PreMix A in a sanitary batch tank 4 to bring the protein concentrations to the desired level, i.e., 10-20% total protein.

Pre-Mix D is added to the batch tank to adjust the pH to between 6.0 and 7.0 and preferably to 6.2-6.6. Pre-Mix C is added to the batch tank resulting in a prepared protein solution 11 which is ready for heat processing under shear conditions to form EWP/CM protein particles useful as a fat/cream substitute food ingredient.

The prepared protein solution 11 is deaerated in a sanitary deaerator 6 to reduce dispersed and dissolved oxygen to a minimum. The heat/shear process can be accomplished in a single high shear heat processor but it is preferably conducted in two units employing a preheater 7 and a high shear heat processor 8. The preheater 7 is used to raise the temperature of the prepared protein solution to 120-170° F. (48-77° C.) and preferably to 140-165° F. (60-74° C.) so that the temperature rise in the high shear heat processor 8 yields an outlet temperature suitable for pasteurization, i.e., 15 176-186° F. according to U.S. Food and Drug Administration (FDA) guidelines. The material exiting the high shear heat exchanger 8 is cooled in conventional heat exchanger 10 to a temperature between 35-40° F. (1.5-4.5° C.) within a few minutes. The resulting macrocolloidal EWP/CM protein particle product is suitable for use as a fat or cream substitute ingredient. The above-described process for making EWP/CM protein particles is preferably performed adjacent to a food processing line where the protein cream substitute may be delivered in-line to a food manufacturing line. Alternatively, if the resulting material is to be shipped or stored for future use, a holding tube 9 is inserted into the process between the high shear processor 8 and the cooler 10 so that the product can be passed through the holding tube 9 for a time sufficient to achieve pasteurization of the EWP/CM cream substitute. After pasteurization, the product is cooled and stored at 35-40° F.

When the high shear heat exchanger 8 is the apparatus described in previously mentioned U.S. patent application Ser. No. 127,710, then a blade rpm rate of between about 3,000 and 10,000 and preferably from about 5,000 to about 7,500 rpm is sufficient to result in a product which has the consistency and mouthfeel of heavy cream (fat).

Examination of electron micrographs suggests that the EWP/CM protein particles are predominantly comprised of particles having an inner core of casein micelle and an outer shell of denatured egg white protein. A minor portion of the protein particles are denatured egg white protein particles and agglomerated casein micelle particles. In some instances more than 1 casein micelle will be found within the coagulated protein particle.

Figure 2:
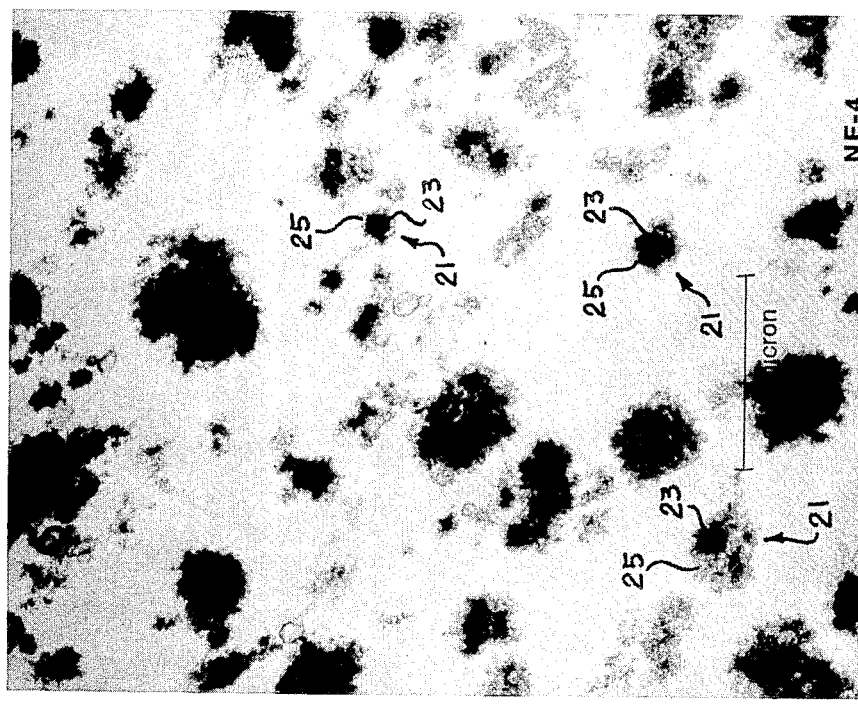
FIG. 2 is an electron micrograph which shows egg white protein/casein micelle macrocolloidal particles wherein a predominant number of particles have a casein micelle core and an outer shell of denatured egg white protein.
Figure 5:
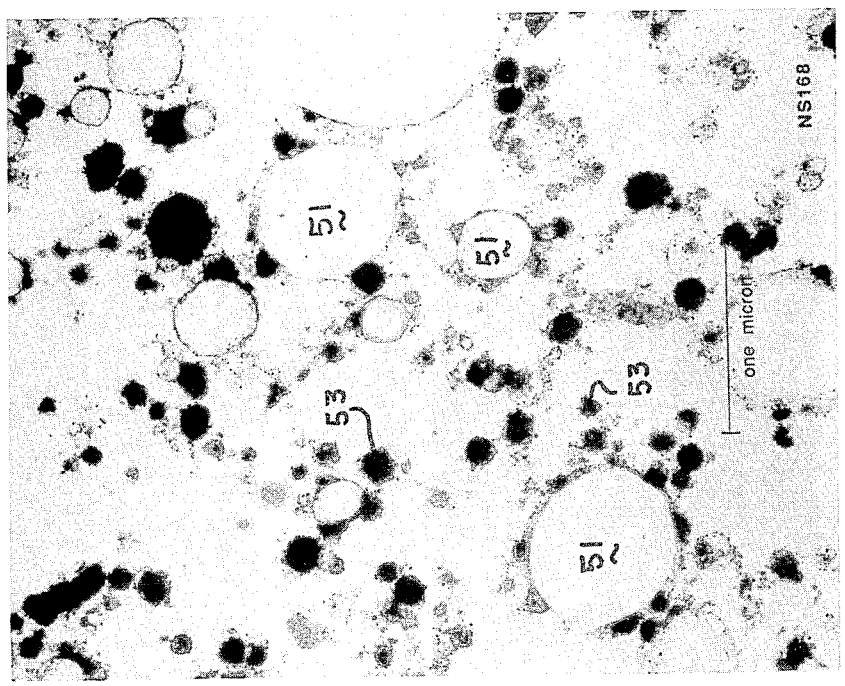
FIG. 5 is an electron micrograph of a super premium ice cream.
Figure 4:
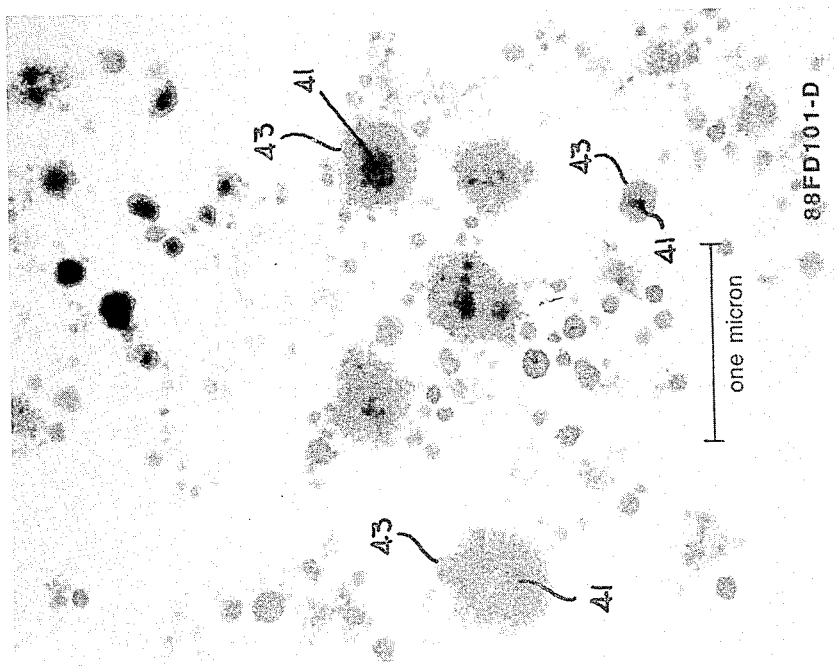
FIG. 4 is an electron micrograph of an ice cream analog product which contains egg white protein/casein micelle macrocolloid as a replacement for heavy cream.

Referring to FIG. 2, EWP/CM protein particles 21 are shown to have a core of one or more casein micelle particles 23 (seen as dark bodies inside the particles) and a shell of denatured egg white protein 25 (seen as the lighter outer portion of the particles). The EWP/CM protein particles of FIG. 2 were prepared employing substantially the same procedure as described in Example 7 below. FIG. 3 shows EWP/CM protein particles 31 which were prepared by an in situ process according to the procedures described in Example 6. It is noteworthy that in FIG. 3 the denatured EWP shell 35 generally occupies less of the total volume of the particles relative to the casein micelles 33 than in the EWP shells of the particles of FIG. 2. The core/shell configuration of protein particles is seen more dramatically in FIG. 4 which is a micrograph of a frozen dessert employing a cream substitute of Example 7. The casein micelle core 41 is readily seen in various particles while the lighter, less dense, shell portion 43 of these particles is denatured EWP. Also apparent in FIG. 4 are casein micelles 45 which possess no EWP shell. FIGS. 2 through 4 may be compared with FIG. 5, an electron micrograph of a super premium ice cream ($18\tfrac{1}{6}$% butterfat). In FIG. 5, the relatively large white circles represent fat globules and the small dark bodies 53 are casein micelles.

The EWP/CM protein particles form a macrocolloid useful as a fat/cream substitute ingredient for frozen desserts and additionally in mousses, sauces, dips, cream pie fillings, icings and similar food products which normally contain cream. The EWP/CM macrocolloid is substituted for the cream in these food formulations by merely substituting the macrocolloid for the cream during the manufacturing process. Usually, EWP/CM cream substitute ingredient is substituted for heavy cream on about a 1:1 wet ratio basis. This represents a substitution of about 1 gram of protein for about 3 grams of fat/cream because the EWP/CM cream substitute has water, polyhydric compounds, aggregate blocking agents and other ingredients present in it. The optimum amount of EWP/CM cream substitute to be employed for a given food application can be readily determined by one skilled in the art by conducting routine sensory evaluations.

The EWP/CM protein particles will generally have a diameter of from about 0.1 to about 3 microns and preferably a mean diameter of from about 0.5 to about 2.5 microns to achieve the mouthfeel of fat/cream. It is also desirable to have the EWP/CM particles present in frozen foods in quantities of at least $1 \times 10^8$ particles per cc of the final food product and preferably between $1 \times 10^8$ and $1 \times 10^{12}$, or more particles/cc.

The following examples relate to preferred methods and procedures for the preparation of macrocolloids for practice of the present invention. Example 1 relates to a preferred method for the production of macrocolloid material extracted from whey materials. Example 2 relates to the production of macrocolloid material from bovine serum albumin. Example 3 relates to the production of macrocolloid material from egg white albumen while Example 4 relates to the use of soy protein to form macrocolloid materials. Example 5 relates to preparation of ice cream-like frozen desserts wherein macrocolloid products such as those of Examples 1-4 are incorporated in ice cream premix formulations in place of the butterfat component ordinarily incorporated. Example 6 relates to ice cream-like products prepared from premixes wherein heat coagulable protein are included and denatured protein particles in appropriate numbers and within the desired size ranges are formed in situ during pasteurizing/blending processing of the premix. Example 7 relates to a preferred method of preparing an egg white/casein micelle cream substitute ingredient of the present invention. Example 8 relates to a frozen dessert which contains the cream substitute of Example 7 as a replacement for heavy cream. Example 9 relates to an optimization study for use of the Example 7 product in an ice cream-like product. These examples should not be construed as limiting the scope of the present invention.

EXAMPLE 1

An extraction procedure was carried out for the removal of fat and cholesterol from the whey protein concentrate (WPC) protein source prior to denaturation processing. More specifically, a reactor was charged with 181 kg of absolute ethanol (Lot Nos. 16468x, 16995x, Aaper Alcohol & Chemical Co., Shelbyville, Ky.). Water (8.58 kg) and 10% citrus acid solution (954 grams, Miles, Elkhart, Ind.) were then added and the solution was agitated for about two minutes. The pH of the solution was then measured to confirm that it was pH 5.0±0.5.

One hundred and forty pounds (63.5 kg) of whey protein concentrate WPC-50 (lot 6302-2 Fieldgate, Litchfield, Mich.) was then added to the reactor and the reactor was sealed. Steam was then admitted to the reactor jacket and the reactor temperature was maintained at 40°-42° C. for 4 hours. The protein slurry was removed from the reactor and filtered on a continuous belt filter allowing the cake thickness to reach 1 inch. The collected cake weighed 116 kg. The reactor was charged with 127 kg of 95% ethanol and the wet cake was added to the reactor to form a slurry which was mixed for 20 minutes. The slurry was then removed, filtered as before, and the collected cake was again added to the reactor charged with 127 kg of 95% ethanol. The slurry was mixed for 20 minutes and was then filtered with care taken to remove as much liquid as possible. The wet cake weighed 104.5 kg.

The wet cake was then placed in trays to a uniform depth of 1 inch or less. The material was then dried under vacuum for 12 hours at temperature of 45°±1° C., providing 51.5 kg of WPC material for a yield of 80.9%. Calculating that approximately 3.5 kg of material had been lost in the dryer, the percentage of volatiles in the initial wet cake was calculated to be 47.4%.

The resulting material had a protein concentration of 56.91% and a solubility of 93% measured according to the solubility determination method described above. The protein was then employed to make up a formulation which included lecithin ("Lecigran F", Riceland, Little Rock, Ark.), 37% Food Grade hydrochloric acid (J. T. Baker, Phillipsburg, N.J.), xanthan ("Keltrol T", Kelco, San Diego, Calif.) and water.

TABLE 1

| Whey Protein Formulation | | |
|---|---|---|
| Ingredient | % | Wt. (g) |
| WPC-50 | 34.500 | 690.00 |
| Lecithin | 0.932 | 18.64 |
| Hydrochloric Acid | 1.590 | 31.80 |
| Xanthan | 0.186 | 3.72 |
| Water | 62.792 | 1255.00 |
| | 100.000 | 2000.00 |

The components of the formulation listed in Table 1 above were added to a high shear mixer and deaerator (Kady Mill, Scarborough, Me.) in the following order: water, hydrochloric acid, lecithin, xanthan and whey protein concentrate. The mixture was deaerated, with care taken to minimize the conversion of mechanical energy to heat, before being introduced into batch process apparatus of the previously mentioned U.S. patent application Ser. No. 127,710 (Attorney's Docket No. 10057). The processing vessel was then filled with the premix which had a pH of 4.15, sealed and the temperature recorder was turned on. The motor was activated, and the speed of the blade was adjusted to 5,080 rpm. After a few seconds, heating fluid with a temperature of 100° C. was circulated through the jacket of the vessel. The product reached a temperature of 122° C. in 4.3 minutes, at which time the heating fluid was displaced by a flow of cold water which cooled the product to 40° C. within 2 minutes.

The product obtained from the above process was then evaluated for its organoleptic and physical characteristics. The product had a smooth and creamy consistency with 64% of the protein converted to macrocolloid particles with 0% of the produced particles having dimensions exceeding 3 microns. The spherical particles had a volume-weighted mean diameter ($D_v$) of 0.99 microns, a mean particle size diameter ($D_n$) of 0.78 microns and a maximum diameter ($D_{max}$) of 1.50 microns.

EXAMPLE 2

In this example, bovine serum albumin (BSA) was used to produce a protein macrocolloid product. Bovine serum albumin identified as "Bovine Albumin, Fraction V" was obtained from U.S. Biochemical Corp. (Cleveland, OH). The material was a lyophilized powder with a 97% protein content and a solubility of 99% according to the solubility determination method described above. Other formulation ingredients included lecithin ("Lecigran F", Riceland, Little Rock, AR), 37% Food Grade hydrochloric acid (J.T. Baker, Phillipsburg, N.J.), Xanthan ("Keltrol T", Kelco, San Diego, Calif.), lactose (alpha-lactose monohydrate, Sigma St. Louis, MO) and water.

TABLE 2

| Bovine Serum Albumin Formulation | | |
|---|---|---|
| Ingredient | % | Wt. (g) |
| BSA | 13.080 | 121.64 |
| Lecithin | 2.100 | 19.53 |
| Hydrochloric Acid | 0.770 | 7.16 |
| Xanthan | 0.200 | 1.86 |
| Lactose | 7.560 | 70.31 |
| Water | 76.290 | 709.50 |
| | 100.000 | 930.00 |

The formulation listed in Table 2 above was prepared in a high shear mixer and deaerator (Kady Mill, Scarborough, Me.) with the xanthan gum having been prehydrated. xanthan, lactose and BSA were added to the mixer and the mix was deaerated before being introduced into the processing apparatus as in Example 1. The processing vessel was filled with the premix which had a pH of 4.19, sealed and the temperature recorder was turned on. The motor was activated, and the speed of the blade was adjusted to 5,080 rpm. After a few seconds, heating fluid with a temperature of 80° C. was circulated through the jacket of the vessel.

The product reached a temperature of 126° C. in 4.8 minutes, at which time the heating fluid was displaced by a flow of cold water. The product was cooled to 40° C. within 2 minutes. The shear rate of this processor is reflected in the 46° C. difference between the temperature of the product and the temperature of the heating fluid. This additional heat had been derived from the conversion of mechanical energy to heat at the rate of about 380 J/sec.

The product obtained from the above process was then evaluated for its organoleptic and physical characteristics. The product had a thick consistency similar to the macrocolloid material produced from whey protein concentrate, and a creamy texture with high lubricity. 71% of the protein had been converted to macrocolloidal particles. The particles were dominantly spheroidal although some rod-like and fibrous particles persisted.

These rods and fibers having dimensions exceeding 3 microns accounted for 2.25% of the particles by number. When the rods and fibres were excluded from the microscopy-image analysis, the spheroidal particles had a volume-weighted mean diameter ($D_v$) of 1.03 microns, a mean particle size diameter ($D_n$) of 0.66 microns and a maximum diameter ($D_{max}$) of 1.75 microns.

EXAMPLE 3

In this example, egg white albumen was used to produce a protein macrocolloid product. It was determined that a combination of fresh egg white and spray dried egg white would produce the desired product. Fresh egg white was separated manually on the day the premix was prepared from fresh eggs purchased locally. This egg white was determined to include 98% soluble protein but the protein concentration was less than 10%. Due to the initial protein concentration, processing of fresh egg white alone, can give rise to stringy masses of denatured protein product. Spray dried egg white was obtained from Henningsen Foods (White Plains, N.Y.) (Type P-110 egg white solids) with 80% minimum protein. The protein solubility of the spray dried egg white powder was only 83% and processing of this material alone can generate an unacceptable number of oversize particles. In order to avoid the limitations of using each of the materials alone, the fresh and spray dried egg white materials were combined to provide a suitable egg albumen protein source.

Lecithin, xanthan, hydrochloric acid and lactose were obtained from the sources cited in Example 1 and were utilized in the amounts listed in Table 3 below.

TABLE 3

| Egg White Albumen Formulation | | |
|---|---|---|
| Ingredient | % | Wt. (g) |
| Fresh Egg white | 70.21 | 1168.92 |
| Spray Dried Egg White | 13.44 | 223.72 |
| Lecithin | 2.97 | 49.54 |
| Xanthan | 0.30 | 4.95 |
| Hydrochloric Acid | 2.37 | 39.43 |
| Lactose | 10.71 | 178.35 |
| | 100.00 | 1664.91 |

Fresh egg white, lecithin, xanthan, lactose, spray dried egg white and hydrochloric acid were added in sequence and in the amounts specified in Table 3 to a high shear mixer where they were mixed and deaerated. The resulting premix had a pH of 3.6 and was introduced into the processing apparatus as in Example 1. the processing was carried out with a bath temperature of 80° C. and was continued for 4.33 minutes with the blade speed set at 5,080 rpm. The maximum product temperature was 125° C.

The product obtained from the above procedure was thick and creamy. 88.9% of the protein had been converted to macrocolloidal particles which had 4 pronounced tendency to loosely aggregate. Particle size analysis showed that the particles were within the desired size range with a $D_v=1.22$ of the particles over 2 microns. Substantially all particles were spheroidal.

EXAMPLE 4

In this example, soy protein was used to produce a protein macrocolloid product. Soy protein was obtained from Ralston Purina (SN 1631-32-1, St. Louis, Mo.) which had a protein content of 61.4% and a solubility of 81% according to the method cited above. Lecithin, xanthan, hydrochloric acid and lactose were obtained from the sources cited in Example 1 and were utilized in the amounts listed in Table 4 below.

TABLE 4

| Soy Protein Formulation | | |
|---|---|---|
| Ingredient | % | Wt. (g) |
| Soy Protein | 22.036 | 99.16 |
| Lecithin | 3.000 | 13.50 |
| Xanthan | 0.100 | 0.45 |
| Hydrochloric Acid | 2.196 | 9.88 |
| Lactose | 10.800 | 48.60 |
| Water | 61.868 | 278.41 |
| | 100.000 | 450.00 |

The mix was prepared by adding water, hydrochloric acid, lecithin, xanthan, lactose and soy protein in sequence to a high shear mixer where they were mixed and deaerated. The resulting premix had a pH of 3.74 and was introduced into the processing apparatus of FIG. 1. The bath temperature was kept at 110°. Heating was continued for 4.30 minutes with the speed set at 5,080 rpm. The maximum temperature reached by the product was 119° C.

The product developed a light tan color during cooking and was smooth, creamy, and thick with a somewhat beany taste typical of soy products. 71% of the protein was converted to macrocolloidal particle. Particle size analysis showed that the particles were within the desired size range, with a $D_v$ of 1.46 microns and a $D_{max}$ of 2.5 microns. Substantially all particles were spheroidal.

EXAMPLE 5

An ice cream-like frozen dessert was produced utilizing whey macrocolloid product according to the following procedure. One hundred and forty pounds of WPC-50 whey protein concentrate (Fieldgate brand First District Assoc., Litchfield, Minn. 55355, lot 6302-2) was subjected to the extraction procedure according to Example 1. One hundred and seventeen pounds of extracted protein was recovered. The extracted whey material was 97.6% soluble (according to the method disclosed above), had a protein content of 56.7%, a fat content of 1.9% and a cholesterol content of 53.1 mg/100 grams.

The extraction-treated whey protein concentrate was then mixed thoroughly in a blender with lecithin ("Lecigran F", Riceland, Little Rock, Ark.), 37% Food Grade hydrochloric acid (J.T. Baker, Phillipsburg, N.J.), xanthan ("Keltrol T", Kelco, San Diego, Calif.) and water in proportions according to Table 5 below to produce a protein premix with a pH of 4.28.

TABLE 5

| Whey Protein Formulation | | |
|---|---|---|
| Ingredient | % | Wt. (pounds) |
| WPC-50 | 34.500 | 48.300 |
| Lecithin | 0.932 | 1.305 |
| Hydrochloric Acid (37%) | 1.595 | 2.233 |
| Xanthan | 0.186 | 0.260 |
| Water | 62.787 | 87.902 |
| | 100.000 | 140.000 |

The protein premix was deaerated and charged at a rate of about 55 pounds per hour to a pair of votator scrape surface heat exchangers (3"×12") (Chemetron Corp., Louisville, Ky.) operated at 980 RPM. The product was introduced into the first heat exchanger at about 60° F. and the temperature was steadily increased to about 190° F., whereupon the product was transferred by piping to the second heat exchanger for cooling to about 70° F. The processing device was operated for about three hours and twenty minutes with samples taker for analysis at various times. The macrocolloid samples were subjected to size and other types of analysis with the results presented in Table 6 below. Viscosity was determined using a cone and plate viscosimeter (Haake, Saddlebrook, N.J.).

TABLE 6

| Sample No. | Time | Product Temp. (°F.) | Flow Rate (lbs/hr) | Viscosity (cps) | Dn (microns) | Dv (microns) | Dmax (microns) | Comments |
|---|---|---|---|---|---|---|---|---|
| 1 | 0:00 | 182 | 55 | 227 | 0.70 | 1.06 | 1.75 | |
| 2 | 0:03 | | | | | | | |
| 3 | 0:11 | | | | | | | |
| 4 | 0:30 | | | | | | | |
| 5 | 0:33 | 183 | 55 | | | | | |
| 6 | 1:00 | 184 | 55 | 246 | 0.74 | 1.05 | 2.00 | |
| 7 | 1:02 | | | | | | | |
| 8 | 1:10 | | | | | | | |
| 9 | 1:39 | 187 | 55 | 407 | 0.76 | 1.22 | 2.00 | |
| 10 | 1:41 | | | | | | | |
| 11 | 1:49 | | | | | | | |
| 12 | 2:18 | 190 | 55 | 283 | 0.78 | 1.14 | 2.00 | |
| 13 | 2:44 | 190 | 86 | 266 | 0.85 | 1.30 | 2.50 | |
| 14 | 2:47 | | | | | | | |
| 15 | 3:01 | 199 | 86 | 278 | 0.73 | 1.16 | 2.00 | poor quality |
| 16 | 3:15 | | | | | | | |
| 17 | 3:20 | 187 | 55 | 258 | 0.79 | 1.30 | 2.00 | |

Whey macrocolloid protein product produced coincident with sample 7 was then used to produce an ice cream-like frozen dessert. The "ice cream" formulation comprised 2,200 grams of whey macrocolloid product as a substitute for heavy cream in a formulation comprising condensed skim milk (30% solids), sucrose (Bakers Special), stabilizer (Fanci Freeze 1065, Celanese Corp., Louisville, Ky.), sodium hydroxide solution and water.

The ingredients of Table 7 were mixed in the following order. The sucrose and stabilizer were dry blended and added to a mixture of water (1,976.7 grams) and condensed skim milk while being subjected to high shear mixing to yield a sucrose/stabilizer/milk solids component. The whey macrocolloid was diluted with water (550 grams) and then combined under high shear mixing conditions with a diluted mix of sodium hydroxide and water (110 grams) to form a neutralized macrocolloid "cream". The final mixture was then formed by addition of the macrocolloid "cream" to the sucrose/stabilizer/milk solids component.

TABLE 7

| Ice Cream Formulation | | |
|---|---|---|
| Ingredient | % | Wt. (grams) |
| Sucrose | 19.60 | 2,156 |
| Stabilizer | 0.40 | 44 |
| Condensed skim milk | 25.86 | 2,844.6 |
| Water | 17.97 | 1,976.7 |
| Whey Macrocolloid | 20.00 | 2,200 |
| Water | 5.00 | 550 |
| NaOH solution (10%) | 1.17 | 128.7 |
| Water | 10.00 | 1100 |

The mix was pre-heated to 135° F. in a pasteurizer (APV plate heat-exchanger, APV, Tonawanda, N.Y.), homogenized, pasteurized at 155° F. for 30 minutes, cooled to 52° F. and aged overnight prior to freezing.

The "ice cream" mix was then flavored with sliced freeze dried strawberries and strawberry and vanilla flavor to produce a strawberry ice cream. The ingredients were mixed by hand in proportions according to Table 8.

TABLE 8

| Strawberry "Ice Cream" Formulation | | |
|---|---|---|
| Ingredient | % | Wt. (grams) |
| Ice Cream Mix | 98.23 | 4,400 |
| Strawberry Flavor | 0.20 | 8.8 |
| Vanilla Flavor | 0.10 | 4.4 |
| Sliced Freeze Dried Strawberries | 1.47 | 66.0 |
| | 100.00 | 4,479.2 |

The chilled mix was then charged into an automatic ice cream mixer (Coldelite, N.J.) and run for about 20 minutes, whereupon the product (at a temperature of about 18° F.) was removed.

Two runs of the strawberry "ice cream" formulation were produced resulting in 2.9 gallons of finished strawberry "ice cream" characterized by a creamy (not icy) texture. The product was compared against each of two commercial ice cream products in blind comparisons by groups of 60 untrained panelists against two premium brands of strawberry ice cream each comprising approximately 14 to 16% butter fat. In comparisons of texture, the overall appeal of the three products was roughly comparable, while in comparisons of creaminess, smoothness and texture, no significant difference was detected at the $\alpha=0.05$ significance level as may be seen in the results listed in Table 9 below.

TABLE 9

Texture Comparisons of Strawberry Ice Cream

| | Exemplary Product (n = 26) | Premium Brand No. 1 (n = 26) | Exemplary Product (n = 27) | Premium Brand No. 2 (n = 26) |
|---|---|---|---|---|
| Overall Appeal (9 = Like extremely) | 6.7 | 7.7 | 6.7 | 7.1 |
| Creaminess (5 = Much too creamy) | 3.3 | 3.0 | 2.9 | 3.0 |
| Smoothness (5 = Extremely smooth) | 3.9 | 3.9 | 3.6 | 3.9 |
| Texture (5 = Much too dense) | 3.2 | 3.0 | 2.8 | 2.8 |

Three premium grade ice creams and one standard grade (supermarket brand) vanilla ice cream were subject to comparative analysis with a vanilla "ice cream" formulation prepared essentially according to Example 5, using a dairy whey macrocolloid as a complete substitute for milk fat. Results of the comparative analysis are set out in Table 10 below.

TABLE 10

APPROXIMATE ANALYSIS OF FROZEN DESSERTS
Per 100 grams Product

| Sample | Protein grams | Moisture grams | Fat grams | Ash grams | C. Fiber grams | Carbohydrate grams | Calories |
|---|---|---|---|---|---|---|---|
| 1. Premium Grade Ice Cream No. 1 | 4.1 | 57.5 | 17.0 | 0.8 | <0.1 | 20.6 | 252 |
| 2. Premium Grade Ice Cream No. 2 | 4.6 | 55.1 | 15.9 | 1.0 | <0.1 | 23.4 | 255 |
| 3. Premium Grade Ice Cream No. 3 | 2.8 | 59.3 | 15.4 | 0.7 | <0.1 | 21.8 | 237 |
| 4. Standard Grade Ice Cream | 3.0 | 62.4 | 9.8 | 0.8 | <0.1 | 24.0 | 196 |
| 5. Example 5 Product | 7.1 | 66.5 | 0.5 | 1.2 | <0.1 | 24.7 | 132 |

EXAMPLE 6

A chocolate-favored ice cream-like frozen dessert according to the invention and involving in situ formation of denatured protein particles was prepared through formulation of a premix of the ingredients set out in Table 11.

TABLE 11

| Component | | Percent By Weight | Percent By Weight Protein |
|---|---|---|---|
| A | Liquid egg white | 40.000 | 4.056 |
| B | Condensed skim milk (30.15% solution) | 26.250 | 2.862 |
| C | Sugar | 16.000 | — |
| D | Water | 7.940 | — |
| E | Non-fat dry milk | 3.700 | 1.338 |
| F | Liquid egg yolk | 0.900 | — |
| G | Citrus acid (10% solution) | 1.800 | — |
| H | Frodex 36 (corn syrup solids) | 1.230 | — |
| I | Keltose (alginate) | 0.250 | — |
| J | Locust bean gum | 0.080 | — |
| K | Cocoa (Gerkin's Sienna) | 0.875 | — |
| L | Cocoa (Bensdorp Royal Dutch) | 0.875 | — |
| M | Vanilla | 0.080 | — |
| N | Cream flavor (Naarden) | 0.020 | — |
| | | 100.000 | 8.256 |

A dry blend of components E, H and I, and the sugar component, C, was prepared. The condensed skim milk, B, and water, D, were loaded into a Liquivertor mixing device and the dry blend and other dry ingredients, E, J, K and L were added with mixing to dissolve and disperse all components. The egg yolk, F, was thereafter added with continued mixing. When all components were well dissolved, the liquid egg white, A, was added and mixed briefly, followed by addition of the citrus acid solution, G, in a quantity sufficient to achieve a pH for the total mixture of from 6.2 to 6.5. After checking and adjustment of pH as required, the agitator was turned off.

The premix formed above was then subject to pasteurization under high temperature short time (HTST) conditions with agitation and application of high shear forces by two alternate processes. More specifically, about one-third of the mix was initially warmed by charging into a 3"×12" eccentric votator scrape surface heat exchanger operated at a speed of 450 RPM. Upon reaching the temperature of approximately 140° F., the mix was passed into a continuous apparatus as illustrated in FIG. 2 of copending U.S. patent application Ser. No. 127,710 with the speed of the blade set at approximately 5,000 RPM. Upon attaining a temperature of approximately 180° F., the mix was passed through a ½" OD, ⅜" ID, insulated metal "holding" tube within which the mix temperature was maintained at about 176° F., the mean residence time of the mix passing through the tube being established at about 20 seconds. Post-pasteurization cooling of the mix was accomplished by passage through a first 3"×12" eccentric votator scrape surface heat exchanger operated at about 1000 RPM to effect a temperature drop from 176° F. to 80° F., followed by passage through a 3"×12" concentric votator scrape surface heat exchanger operated at about 300 RPM to effect a temperature drop to about 38° F. Flavorings, M and N, were than added and, after optional aging, the flavored mix was frozen in a conventional ice cream freezer. Use of a freezer unit equipped with a high displacement dasher and characterized by high freezing capacity is preferred.

About two-thirds of the premix was subjected to high shear processing through use of the votator scrape surface heat exchangers alone. More specifically, the mix was processed through a 3"×12" eccentric votator run at approximately 1000-1100 RPM to raise the temperature to approximately 180° F. and the mix was thereafter passed through a holding tube as previously described, allowing for maintenance at 176° F. for a mean time of 20-22 seconds. Passage through a second eccentric votator run at about 1000-1100 RPM allowed for a product temperature drop to about 60° C. and final reduction of product temperature to about 40° F. was effected using the concentric votator run at about 300 RPM. Thereafter, the mix was subjected to further processing as above.

Products produced by the two above high shear pasteurization processes were subject to sensory evaluation and the product of the first sensory evaluation and the product of the first alternative process was somewhat preferred in terms of smoothness, creaminess and texture.

Practice of the invention in developing frozen dessert products through preparation of fat-free or substantially fat-free and coagulable protein rich premixes generally involves provision of premixes which include up to 20 percent by weight protein, of which from 25 to 100 percent is provided in the form of a heat coagulable protein. The Table 11 formulation, for example, results in a premix which comprises 8.256 percent by weight protein. Of this protein, 4.20 percent (derived from the condensed skim milk and Non Fat Dry Milk components) is essentially non-heat coagulable and 4.056 percent (derived from the liquid egg whites) is heat coagulable.

Analysis of the ice cream analog product for presence of denatured protein particles is accomplished as follows. A determination was made of the number of particles having diameters ranging from 0.1 to 3.0 microns which would occupy a one cubic centimeter volume, the calculated values are set out in Table 12 below.

TABLE 12

| Calculated Number Of Particles That Occupy 1 c.c. Volume By Different Particle Sizes | |
|---|---|
| Micron Range | Number of Particles Per c.c. |
| 0.0–0.1 | $1.53 \times 10^{16}$ |
| 0.1–0.2 | $5.66 \times 10^{14}$ |
| 0.2–0.3 | $1.22 \times 10^{14}$ |
| 0.3–0.4 | $4.45 \times 10^{13}$ |
| 0.4–0.5 | $2.09 \times 10^{13}$ |
| 0.5–0.6 | $1.15 \times 10^{13}$ |
| 0.6–0.7 | $6.95 \times 10^{12}$ |
| 0.7–0.8 | $4.53 \times 10^{12}$ |
| 0.8–0.9 | $3.11 \times 10^{12}$ |
| 0.9–1.0 | $2.23 \times 10^{12}$ |
| 1.0–1.1 | $1.65 \times 10^{12}$ |
| 1.1–1.2 | $1.25 \times 10^{12}$ |
| 1.2–1.3 | $9.80 \times 10^{11}$ |
| 1.3–1.4 | $7.76 \times 10^{11}$ |
| 1.4–1.5 | $6.26 \times 10^{11}$ |
| 1.5–1.6 | $5.13 \times 10^{11}$ |
| 1.6–1.7 | $4.25 \times 10^{11}$ |
| 1.7–1.8 | $3.56 \times 10^{11}$ |
| 1.8 × 1.9 | $3.02 \times 10^{11}$ |
| 1.9–2.0 | $2.57 \times 10^{11}$ |
| 2.0–2.1 | $2.22 \times 10^{11}$ |
| 2.1–2.2 | $1.92 \times 10^{11}$ |
| 2.2–2.3 | $1.67 \times 10^{11}$ |
| 2.3–2.4 | $1.47 \times 10^{11}$ |
| 2.4–2.5 | $1.30 \times 10^{11}$ |
| 2.5–2.6 | $1.15 \times 10^{11}$ |
| 2.6–2.7 | $1.03 \times 10^{11}$ |
| 2.7–2.8 | $9.18 \times 10^{10}$ |
| 2.8–2.9 | $8.25 \times 10^{10}$ |

TABLE 12-continued

| Calculated Number Of Particles That Occupy 1 c.c. Volume By Different Particle Sizes | |
|---|---|
| Micron Range | Number of Particles Per c.c. |
| 2.9–3.0 | $7.44 \times 10^{10}$ |

Product samples were subject to analysis using a Horiba particle size distribution analyzer (Model CA-PA700, Horiba Ltd., Miyanohigashi Kisshoin Minami-Ku Kyoto, Japan) to determine the relative proportion of total particles (within the 0.1 to 3.0 micron range) for each micron range indicated in Table 12.

Product samples were also subject to ultracentrifugation analysis using a Beckman Ultracentrifuge (Model No. L8-70M, Beckman Instruments, Inc., Palo Alto, Calif.). More specifically, samples were diluted with water to develop 20% dispersions. These were shaken by hand and then sonicated for 30 seconds at 100 watts to uniformly disperse the diluted samples. Thereafter, the diluted samples were centrifuged at 25,000 RPM for 25 minutes at 22° C. using an SW 28 rotor. The volume of the supernatant was then measured and the volume occupied by the particles was determined by subtraction from the original volume to determine the percent of the original, undiluted, sample occupied by the particulate material. For any given sample, the number of particles within any particular size range may be determined by mutiplying the Table 12 value times the size distribution percentage times the percent of the sample occupied by all particles as determined by ultracentrifugation.

As previously indicated, frozen dessert products of the present invention are uniquely characterized by the presence therein of denatured protein particles with diameters within the range of 0.5 to 2.5 microns in numbers in excess of $1-10^8$ It is preferred that products of the invention include 1-109 and up to $1-10^{12}$ or more such particles.

Electron microscopic analysis of particles formed in this example (FIG. 3) indicates a core/shell conformation for a number of particles, with the shell of egg white protein comprising a thinner layer than present in particles form in practice of Example 7.

EXAMPLE 7

The following components were employed in the preparation of an egg white/casein micelle cream substitute food ingredient as described below:

TABLE 13

| Component | Weight Percent (%) | Comment |
|---|---|---|
| Ultrafiltered Egg Whites (17% Protein) | 55.00 | Contribution of 9.35% of total weight of composition |
| Condensed Skim Milk (11% Protein) | 22.65 | Contribution of 2.50% of total weight of composition |
| Lecithin | 0.30 | |
| Sugar | 5.00 | |
| Pectin (apple-derived) | 0.35 | |
| Citric Acid | 0.17 | To adjust pH to 6.6 |
| Water | 16.53 | |
| | 100.00 | |

STEP A: PRE-PREPARATION

The sugar and pectin were dry blended (PreMix A). Pasteurized liquid egg whites were ultrafiltered in a Dorr-Oliver Series S ultrafiltration system having a polysulfone membrane resulting in ultrafiltered egg whites having a 17% protein content (PrePreparation B). The lecithin was hydrated with reverse osmosis purified water in a STEPHAN ® vertical Cutter/mixer VCM 12 R&D Model (Pre-Mix C). A dilute solution of citric acid in reverse osmosis water was prepared (Pre-Mix D).

STEP B: BATCH MAKE-UP

As shown in FIG. 1 and 1A, the sugar-pectin blend (Pre-Mix A) is hydrated in reverse osmosis water in a TRI-BLENDER® high shear mixer. Sufficient ultrafiltered egg white (Pre-Preparation B) and condensed skim milk are added to the hydrated sugar-pectin blend in a sanitary batch tank to bring the protein concentrations to the target levels shown above. A sufficient quantity of dilute citric acid (Pre-Mix D) was added to the mixture to adjust the pH of the mix to a pH of 6.6. The hydrated lecithin (Pre-Mix C) was added to the mixture to complete the batch formulation. This batch formulation was deaerated in D-16 VERSATOR ® deaerator to reduce dispersed and dissolved oxygen.

STEP C: HEAT PROCESSING

The batch formulation was pumped into a series of heat processing units to preheat the batch to a temperature between 120-160° F. before the heat processing treatment. The batch formulation was then caused to flow through sanitary piping connections into the fluid process apparatus of previously mentioned U.S. patent application Serial No. 127,170, filed on 2 December, 1987 at a flow rate of 120 lb/hr and at a temperature of 176-190° F. The fluid processor blade was set at 5,000-7,500 rpm to achieve an egg white protein/casein micelle (EWP/CM) microparticulated product having a desirable cream-like texture. The average residence time of the batch formulation in the fluid processor was about 30 seconds. The resulting egg white/casein micelle fat substitute was used immediately (in-line) to make a frozen dairy dessert. When the frozen dairy dessert operation was complete, a holding tube was employed to pasteurize the egg white/casein micelle fat substitute according to FDA procedures, i.e., 177-190° F./25 sec. The pasteurized fat substitute was then cooled to 35-40° F. and stored at this temperature for future use.

EXAMPLE 8

The egg white protein/casein micelle fat substitute made in Example 7 was employed has an ingredient instead of heavy cream in the preparation of ice cream-like frozen desserts (vanilla flavor). This frozen dessert was evaluated for its creamy texture and overall acceptability by a panel of consumers. Three commercial brands of vanilla ice cream were also evaluated by separate groups of consumers. The mean attribute ratings related to creaminess (creaminess, richness and smoothness) all showed this frozen dessert product to fall within the range of ratings observed for the commercial brands, both initially and after five days of cycled temperature storage.

EXAMPLE 9

An optimization study was conducted to determine the amount of egg white protein/casein micelle fat substitute of Example 7 required in a frozen dessert which simulates the texture of a super premium ice cream, having about 16% butterfat. The best frozen frozen dessert made had the following balance of major components as listed in Table 14.

TABLE 14

| Component | Weight Percent (%) |
|---|---|
| Total protein | 9.72% |
| Sucrose | 11.4% |
| EWP/CM fat substitute of Example 7 | 31.84%* |

*Constitutes 38.8% of total protein

It is readily apparent that the optimum amount of the egg white protein/casein micelle fat substitute of Example 7 to mimic a super premium ice cream is about 32% by weight the frozen dessert product. It is also readily apparent to one skilled in the art that the optimum amount of egg white protein/casein micelle fat substitute in a given application will vary according to several factors, such as, for example, that type of food product, the desired creaminess, the protein content of the egg white protein/casein micelle fat substitute ingredient, the particle size of the microparticular protein, the presence or absence of aggregate blocking agents, polyhydric compounds, and the like. Routine sensory experiments are conducted to determine the preferred formulation for each food product category.

Typical ice cream-like frozen dessert formulations employing the present egg white protein/casein micelle fat substitute ingredient of Example 7 will contain the components listed in Table 15 below.

TABLE 15

| Component | Weight Percent (%) Range | Preferred |
|---|---|---|
| EWP/CM fat substitute ingredient of Example 7 | 25-40 | 31.8 |
| UF skim milk (4×) | 25-40 | 36.6 |
| Milk solids, non-fat | 0-3 | 1.6 |
| Sugar | 8-20 | 10.0 |
| Egg yolk | 0-2 | 0.9 |
| Stabilizers | 0-1 | 0.4 |
| Corn syrup solids | 0-10 | 8 |
| Starch | 0-1 | 0 |
| Flavors* | as required | 1.1 |
| Water | balance | balance |

Improved whipped frozen dessert products of the present invention as described above with respect to illustrative "ice cream" formulations are readily seen to constitute products possessing the physical and organoleptic character of full fat products but having substantially lower caloric content and higher quality (i.e., higher protein content) nutritional characteristics. While the above illustrative "ice cream" product formulations include sucrose as a sweetener, it will be understood by those of ordinary skill in the art that numerous high-potency alternative sweetener products such as aspartame, alitame, acesulfame K and sucralose may be employed (together with suitable bulking agents, as required) as a substitute for sucrose in preparation of products according to the invention.

In a like manner, while the above illustrative "ice cream" formulations involve total replacement of milk fat with proteinaceous macrocolloid preparations, it will be understood that high quality products of the invention also include frozen desserts wherein the macrocolloid replaces only part (e.g , 50 percent) of the fat and/or oil ordinarily incorporated. Similarly, while "ice cream" products have been illustrated, the present invention may be advantageously applied to the preparation of reduced fat or non-fat (i.e., containing less than 1 percent fat) whipped frozen desserts such as ice milk, custard, sherbet, and the like, as well as to icings, spreads, sauces, dips, mousses, cream pie fillings and similar food products which normally contain cream.

Numerous modifications and variations in practice of the invention are expected to occur to those of ordinary skill in the art upon consideration of the foregoing descriptions of presently preferred embodiments thereof and, consequently, only such limitations as appear in the appended claims should be placed thereon.

What is claimed is:

1. A cream substitute food ingredient comprising substantially non-aggregated speroidally shaped macrocolloidal particles comprising:
   (a) a coagulable protein; and
   (b) a nucleating agent,
   wherein the coagulable protein is denatured around the nucleating agent to form substantially non-aggregated, spheroidally shaped macrocolloidal particles having in a dry state a mean particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming a macocolloid having substantially smooth, emulsion-like organoleptic character.

2. The cream substitute food ingredient of claim 1 wherein the nucleating agent is substantially non-aggregated casein micelles and the coagulable protein is egg white protein.

3. The cream substitute food ingredient of claim 2 wherein the egg white protein is derived from ultrafiltered egg whites and the casein micelles are derived from condensed skim milk or ultrafiltered skim milk.

4. The cream substitute food ingredient claim 1 further comprising:
   (c) a polyhydric compound;
   (d) an aggregate blocking agent; and
   (e) a food grade acid.

5. The cream substitute food ingredient of claim 4 wherein:
   (i) the polyhydric compound is cane sugar, corn sugar, lactose or mixtures thereof;
   (ii) the aggregate blocking agent is pectin, lecithin, xanthan gum, guar gum, datem esters, carrageenan, alginate, malto-dextrins, calcium steroyl lactylate or mixtures thereof; and
   (iii) the food grade acid is lactic acid or citric acid.

6. The cream substitute food ingredient of claim 5 wherein the polyhydric compound is a mixture of sucrose and lactose, the aggregate blocking agent is a mixture of pectin and lecithin and the acid is citric acid.

7. A cream substitute food ingredient comprising substantially non-aggregated spheroidally shaped macrocolloidal particles having a core and a shell surrounding the core wherein:
   (a) the core is comprised of casein;
   (b) the shell is comprised of denatured egg white protein; and
   (c) the macrocolloid protein particles have in a dry state a mean particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming a macrocolloid having substantially smooth, emulsion-like organoleptic character. wherein substantially all of the fat or cream is replaced by the macrocolloid.

8. The cream substitute food ingredient of claim 7 wherein the egg white protein is derived from ultrafiltered egg white.

9. The cream substitute food ingredient of claim 7 wherein the casein is derived from condensed skim milk or ultrafiltered skim milk.

10. The cream substitute food ingredient of claim 7 further comprising:
    a polyhydric compound;
    an aggregate blocking agent; and
    a food grade acid.

11. The cream substitute of claim 10 wherein:
    (i) the polyhydric compound is cane sugar, corn sugar, lactose or mixtures thereof;
    (ii) the aggregate blocking agent is pectin, lecithin, xanthan gum, guar gum, datem esters, carrageenan, alginate, malto-dextrins, calcium steroyl lactylate or mixtures thereof; and
    (iii) the food grade acid is lactic acid or citrus acid.

12. The cream substitute of claim 11 wherein the polyhydric compound is a mixture of sucrose and lactose, the aggregate blocking agent is a mixture of pectin and lecithin and the acid is citric acid.

13. In a good product which contains fat or cream, the improvement which comprises the partial or total replacement of fat or cream by a macrocolloid comprising substantially non-aggregated spheroidally shaped particles wherein the particles:
    (a) have a core of one or more casein micelles surrounded by an outer shell of denatured egg white protein, and
    (b) have in a dry state a mean particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming said macrocolloid having substantially smooth, emulsion-like organoleptic character.

14. The improved food product of claim 13 wherein substantially all of the fat or cream is replaced by the macrocolloid.

15. The improved food product of claim 14 which is an analog of ice cream containing less than one percent fat.

16. The improved product of claim 14 which is a sauce.

17. The improved product of claim 14 which is an icing.

18. The improved product of claim 14 which is a cream pie filling.

19. The improved product of claim 14 which is a spread.

20. The improved product of claim 14 which is a dip.

21. An ice cream-like frozen dessert comprising:
(a) a macrocolloid of substantially non-aggregated spheroidally shaped particles wherein the particles have cores comprising casein micelles and outer shells of denatured egg white protein;
(b) a sweetener;
(c) one or more stabilizers;
(d) a flavoring system; and
(e) non-fat milk solids,
wherein the macrocolloid particles have in a dry state a means particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming said macrocolloid having substantially smooth, emulsion-like organoleptic character.

22. A method of preparing substantially non-aggregated spheroidally shaped macrocolloidal protein particles having cores comprising casein micelles and outer shells of denatured egg white protein, which method comprises:
heating egg white protein and a source of substantially non-aggregated casein micelles, at a pH between about 6.0 and about 7.0 under shear conditions sufficient to form macrocolloidal particles of casein surrounded by denatured egg white protein.

23. The method of claim 22 wherein the egg white is ultrafiltered egg white and the casein micelle source is condensed skim milk or ultrafiltered skim milk.

24. The method of claim 23 conducted in the presence of a polyhydric compound and an aggregate blocking agent.

25. The method of claim 24 wherein:
(a) the polyhydric compound is sugar, corn sugar, lactose or mixtures thereof; and
(b) the aggregate blocking agent is pectin, lecithin, xanthan gum, guar gum, datem esters, carrageenan, alginate, malto-dextrin, calcium steroyl lactylate or mixtures thereof.

26. The method of claim 25 wherein the polyhydric compound is sugar, lactose or a mixture thereof and the aggregate blocking agent is a mixture of pectin and lecithin.

27. The method of claim 23 wherein the temperature of the heat process is from about 80° C. to about 125° C. and the shear rate is from about 5,000 to 7,500 reciprocal seconds.

28. The method of claim 23 wherein the egg white supplies from about 60 to about 99% of the total protein.

29. In a frozen whipped dessert containing fat and/or oil, the improvement comprising the partial or total replacement of fat and/or oil therein by substantially non-aggregated, spheroidally shaped macrocolloid particles having a core and a shell surrounding the core wherein the core is comprised of casein and the shell is comprised of denatured egg white protein, wherein the particles have in a dry state a mean particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming a macrocolloid having substantially smooth, a standard light microscope, the particles in a hydrated state forming a macrocolloid having substantially smooth, emulsion-like organoleptic character.

30. The frozen whipped dessert of claim 29 wherein the macrocolloid particles replace dairy fat in the dessert.

31. The frozen whipped dessert of claim 29 wherein the macrocolloid particles replace greater than 50 percent of the fat and/or oil in the dessert.

32. The frozen whipped dessert of claim 29 wherein the macrocolloid particles totally replace fat and/or oil in the dessert.

33. The frozen whipped dessert of claim 29 which is an analog of ice cream containing less than one percent fat in the dessert.

34. In a method for preparing a frozen whipped dessert by freezing and whipping a mix of frozen dessert ingredients including fat and/or oil, the improvement comprising partially or totally replacing fat and/or oil in said mix with an effective amount of substantially non-aggregated, spheroidally shaped macrocolloid particles having a core and a shell surrounding the core wherein the core is comprised of casein and the shell is comprised of denatured egg white protein wherein the particles have in a dry state a mean particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming a macrocolloid having substantially smooth, emulsion-like organoleptic character.

35. A low or non-fat frozen whipped dessert comprising water, sweetener, flavoring, stabilizer and protein and wherein, at least $1 \times 10^8$ denatured protein particles are present per cubic centimeter, said particles characterized by having a core and a shell surrounding the core wherein the core is comprised of casein and the shell is comprised of denatured egg white protein wherein the particles have diameters in the range of from 0.5 to 2.5 microns.

36. The frozen whipped dessert of claim 35 which comprises from $1 \times 10^9$ to $1 \times 10^{12}$ of said denatured protein particles per cubic centimeter.

37. The frozen whipped dessert of claim 35 which comprises less than 1 percent fat and/or oil.

38. Proteinaceous water dispersible macrocolloid particles comprising:
(a) a coagulable protein; and
(b) a nucleating agent,
wherein the coagulable protein is denatured around the nucleating agent to form substantially non-aggregated, spheroidally shaped macrocolloidal particles having in a dry state a mean particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming a macrocolloid having substantially smooth, emulsion-like organoleptic character.

39. The particles of claim 38 wherein the nucleating agent is substantially non-aggregated casein micelles and the coagulable protein is egg white protein.

40. The particles of claim 39 wherein the egg white protein is derived from ultrafiltered egg whites and the casein micelles are derived from condensed skim milk or ultrafiltered skill milk.

41. The particles of claim 38 further comprising:
a polyhydric compound;
an aggregate blocking agent;
a food grade acid.

42. The particles of claim 41 wherein:

(i) the polyhydric compound is cane sugar, corn sugar, lactose or mixtures thereof;
(ii) the aggregate blocking agent is pectin, lecithin, xanthan gum, guar gum, datem esters, carrageenan, alginate, malto-dextrins, calcium steroyl lactylate or mixtures thereof;
(iii) the food grade acid is lactic acid or citric acid.

43. The particles of claim 42 wherein the polyhydric compound is a mixture of sucrose and lactose, the aggregate blocking agent is a mixture of pectin and lecithin and the acid is critic acid.

* * * * *